(12) United States Patent
Moriya et al.

(10) Patent No.: US 7,800,859 B2
(45) Date of Patent: Sep. 21, 2010

(54) RECORDING/REPRODUCING APPARATUS AND TRACKING SERVO CONTROL METHOD

(75) Inventors: Makoto Moriya, Tokyo (JP); Kazuya Shimakawa, Tokyo (JP)

(73) Assignee: TDK Corporation, Tokyo (JP)

( * ) Notice: Subject to any disclaimer, the term of this patent is extended or adjusted under 35 U.S.C. 154(b) by 53 days.

(21) Appl. No.: 12/036,367

(22) Filed: Feb. 25, 2008

(65) Prior Publication Data

US 2008/0304175 A1    Dec. 11, 2008

(30) Foreign Application Priority Data

Feb. 26, 2007    (JP) ............................. 2007-044926

(51) Int. Cl.
*G11B 5/596* (2006.01)
*G11B 21/02* (2006.01)

(52) U.S. Cl. .................... 360/77.02; 360/75; 360/77.08

(58) Field of Classification Search ........................ None
See application file for complete search history.

(56) References Cited

U.S. PATENT DOCUMENTS

| | | | |
|---|---|---|---|
| 5,592,347 A * | 1/1997 | Mori et al. ................ | 360/77.04 |
| 7,173,788 B2 | 2/2007 | Nakamura et al. | |
| 7,265,930 B2 * | 9/2007 | Nakamura et al. ............ | 360/75 |
| 2005/0128632 A1 | 6/2005 | Nakamura et al. | |
| 2006/0250718 A1 | 11/2006 | Nakamura et al. | |
| 2007/0115580 A1 | 5/2007 | Moriya et al. | |
| 2007/0139804 A1 | 6/2007 | Ito et al. | |

FOREIGN PATENT DOCUMENTS

| | | |
|---|---|---|
| JP | 2005-166115 | 6/2005 |
| JP | 2005-166116 | 6/2005 |

OTHER PUBLICATIONS

U.S. Appl. No. 11/965,091 to Kobayashi et al., filed Dec. 27, 2007.

\* cited by examiner

*Primary Examiner*—Andrew L Sniezek
(74) *Attorney, Agent, or Firm*—Greenblum & Bernstein P.L.C.

(57) ABSTRACT

A recording/reproducing apparatus includes: a rotary-type magnetic recording medium including a track pattern with concentric or spiral data recording tracks; a composite magnetic head including a reproducing element that reads magnetic signals from the medium and a recording element that writes magnetic signals on the medium; a control unit that moves the magnetic head over the medium to carry out tracking servo control on the reproducing element or the recording element to keep the element on a desired track; and a storage unit that stores offset information that specifies offsets for calculating an adjustment used to adjust a head position of the magnetic head during tracking servo control. The stored offset information specifies at least two different offsets per revolution of the medium. During tracking servo control, the control unit changes the adjustment at least once per revolution of the medium in accordance with offsets specified based on the offset information.

12 Claims, 9 Drawing Sheets ature of the Related Art

As one example of this type of recording/reproducing apparatus, Japanese Laid-Open Patent Publication No. 2005-166115 discloses a hard disk drive apparatus (magnetic recording apparatus) constructed so as to be capable of carrying out a process that measures offsets to obtain offset information that is used for tracking servo control. This magnetic recording apparatus includes a discrete track-type hard disk ("magnetic recording medium") where non-magnetic regions ("guard band parts") are formed between tracks ("data recording tracks") in discrete regions ("data track pattern regions"), a composite magnetic head including a reproducing head ("reproducing element") and a recording head ("recording element"), a driving mechanism unit that moves the magnetic head over the magnetic recording medium between the inner periphery and the outer periphery, and a control unit that carries out overall control over the magnetic recording apparatus. The magnetic recording medium described above is provided with offset measuring regions that are disposed between the discrete regions and servo regions (servo pattern regions). The offset measuring regions are entirely constructed of a magnetic material without non-magnetic regions being formed therein.

When this magnetic recording apparatus is used, a measuring process that obtains the offset information is carried out first. More specifically, first the offset measuring regions on the magnetic recording medium are initialized and signals used to measure the offset (a measurement pattern: hereinafter referred to as "measurement signals") are written into the offset measuring regions. When doing so, the measurement signals are written into the offset measuring regions using the recording head in a state where the reproducing head is being made on-track to the innermost data recording track, for example (i.e., a state where the reproducing head is positioned at positions with the same pattern radius (i.e., positions at the same distance from the pattern center) as the innermost data recording track). In this type of magnetic recording apparatus, when the magnetic head is moved to a data recording track in the inner periphery or the outer periphery of the magnetic recording medium, a center line of a data recording track will intersect a line that joins the center of the recording head in the recording width direction and the center of the reproducing head in the read width direction (as one example, a line that is parallel with the direction in which the arm extends), or in other words, a skew angle is produced for the magnetic head. Accordingly, when the reproducing head is being made on-track to a predetermined data recording track in the inner periphery or the outer periphery (that is, when the center of the reproducing head in the read width direction is aligned with the center of a data recording track in the track width direction (i.e., a track center)), the center of the recording head in the recording width direction will not be aligned with the track center of the data recording track, or in other words, the recording head will be off-track (a state where the recording head is "offset"). This means that the measurement signals are recorded at positions that are displaced from the track center by a distance in keeping with the amount by which the recording head is off-track (i.e., this amount being the "offset").

Next, by reading the measurement signals from the offset measuring regions using the reproducing head, a position that is aligned with the center in the radial direction of a region where the measurement signals were written, that is, a position that is aligned with the center in the recording width direction of the recording head during the writes of the measurement signals is specified. More specifically, the measurement signals are read from the offset measuring regions while moving the reproducing head in steps by a predetermined distance in the radial direction of the magnetic recording medium. When doing so, if the reproducing head is located to the inside or outside of the region where the measurement signals were written, the output level (i.e., amplitude) of the reproducing signal for the read measurement signals will fall. On the other hand, if the center in the radial direction of the regions in which the measurement signals were written is aligned with the center in the read width direction (i.e., the radial direction) of the reproducing head, the output level of the reproducing signal for the read measurement signals will reach its maximum value. Accordingly, the control unit specifies the center position of the reproducing head at a point where the output level of the reproducing signal for the measurement signals reaches its maximum value as the center in the radial direction of the regions in which the measurement signals were written and obtains the distance between the specified center and the center of the reproducing head during the writes of the measurement signals (i.e., the track center of the data recording tracks) as the offset of the recording head with respect to the reproducing head.

This process for measuring the offset is carried out at intervals of several tracks, for example, from the inner periphery to the outer periphery of the magnetic recording medium. For data recording tracks where the process for measuring the offset is not carried out, the offset is obtained by an interpolation process using the offsets obtained for the data recording tracks located to the inside and the outside of such data recording tracks. By doing so, an offset (i.e., an optimal offset for each data recording track) is obtained corresponding to each data recording track from the inner periphery to the outer periphery of the magnetic recording medium and such offsets are stored in a storage unit of the magnetic recording apparatus as offset information to be used during tracking servo control.

When data is recorded on a magnetic recording medium in this type of magnetic recording apparatus, tracking servo control is carried out using the offset information stored in the storage unit. More specifically, in the magnetic recording apparatus described above, when data is recorded on a desired data recording track in the inner periphery of the magnetic recording medium for example, the control unit carries out a tracking servo control process that controls the driving mechanism unit to align the center of the recording head in the recording width direction with the track center of the desired data recording track in the discrete regions. When doing so, the control unit adjusts the head position of the magnetic head to the inside, for example, relative to a standard position (as one example, a track center of a data recording track set by a servo pattern) specified based on a servo signal read by the reproducing head when the magnetic head is passing above the servo region immediately before the discrete region where the recording head is to be made on-track. To adjust the head position, the control unit uses an adjustment, which has been calculated based on an offset stored in the storage unit (as one example, an adjustment that is equal to the offset) as offset information for the data recording track on which the recording head is to be made on-track, as a target value. By doing so, recording data is written as a magnetic signal with the recording head made on-track to the desired data recording track.

SUMMARY OF THE INVENTION

However, by investigating the conventional magnetic recording apparatus (hereinafter also referred to as a "recording/reproducing apparatus"), the present inventors found the following problem. That is, the conventional recording/reproducing apparatus is constructed so that an offset (optimal offset) is obtained for every data recording track from the inner periphery to the outer periphery of a magnetic recording medium (hereinafter also referred to as a "magnetic disk") by either a measuring process or an interpolation process that uses the measurement results of such measuring process, with the magnetic head being made on-track to a desired data recording track by tracking servo control that uses an offset that was individually set for the data recording track. In this type of recording/reproducing apparatus, when a magnetic disk is attached to a rotational shaft of a motor, the pattern center of the data track patterns and servo patterns becomes displaced (misaligned) from the center of the rotational shaft (that is, the center of rotation of the magnetic disk), or in other words, the magnetic disk becomes eccentric. More specifically, as shown in FIG. 15, due to the pattern center Cp of the data track patterns and servo patterns being displaced from the rotational shaft of the motor when the magnetic disk 10 is attached to the motor, the pattern center Cp is displaced from the center of rotation Cr of the magnetic disk 10.

When, in this state, the magnetic disk 10 is rotated in the direction of the arrow R while the reproducing element 3r, for example, is being made on-track to a data recording track, the swing arm 4a will rotate in the direction of the arrow B1 about a center of rotation C4 between a state where the track center Ct of the data recording track is positioned relative to the actuator 4 at a position shown by the dot-dash line in FIG. 15 (i.e., a state where the reproducing element 3r is at the point P1) and a state where the track center Ct of the data recording track is positioned at a position shown by the dot-dot-dash line in FIG. 15 (i.e., a state where the reproducing element 3r is at the point P2), or in other words, the swing arm 4a will rotate while the magnetic disk 10 is rotating by 180° in this example. In the same way, the swing arm 4a will rotate in the direction of the arrow B2 about the center of rotation C4 between a state where the track center Ct of the data recording track is positioned relative to the actuator 4 at a position shown by the dot-dot-dash line in FIG. 15 (i.e., a state where the reproducing element 3r is at the point P2) and a state where the track center Ct of the data recording track is positioned at the position shown by the dot-dash line in FIG. 15 (i.e., a state where the reproducing element 3r is at the point P1), or in other words, the swing arm will rotate while the magnetic disk 10 is rotating by another 180° in this example.

When the track center Ct of the data recording track intersects a line that joins the center of the recording element 3w in the recording width direction and the center of the reproducing element 3r in the read width direction (i.e., a line that is parallel to the direction in which the swing arm 4a extends) in a state where the reproducing element 3r is being made on-track to a data recording track, as described earlier, the center of the recording element 3w in the recording width direction will be displaced from the track center Ct, so that the recording element 3w becomes off-track. Here, the amount by which the recording element 3w is off-track (i.e., the offset) will change according to the amount by which the swing arm 4a rotates. More specifically, as shown on the left in FIG. 16, when the center C3r of the reproducing element 3r in the read width direction is positioned at the track center Ct of the data recording track at the point P1, the distance (i.e., offset) along the radial direction of the magnetic disk 10 between the center C3w of the recording element 3w in the recording width direction and the track center Ct of the data recording track is the distance Ha along the radial direction between the track center Ct and the center C3w, and as shown on the right in FIG. 16, when the center C3r of the reproducing element 3r is positioned at the track center Ct of the data recording track at the point P2, the offset is the distance Hb along the radial direction between the track center Ct and the center C3w.

In this way, when the pattern center Cp is displaced from the center of rotation Cr, in a state where the reproducing element 3r is being made on-track to a predetermined data recording track (i.e., in a state where the center C3r is positioned on the track center Ct of a predetermined data recording track), the distance between the track center Ct of the data recording track and the center C3w of the recording element 3w will continuously change during one revolution of the magnetic disk 10. However, since a conventional recording/reproducing apparatus is constructed to make the recording element 3w on-track to a desired data recording track by tracking servo control that uses one offset per data recording track, when the pattern center Cp is displaced from the center of rotation Cr, it is difficult to maintain a state where the recording element 3w is made on-track to a desired data recording track (i.e., a state where the center C3w of the recording element 3w is positioned at the track center Ct of a predetermined data recording track).

More specifically, when the distance Ha described above is set as the offset for a predetermined data recording track, as shown on the left in FIG. 17, in the vicinity of the point P1 described above, the center C3w of the recording element 3w can be aligned with the track center Ct of the desired data recording track (i.e., the recording element 3w can be made on-track) by adjusting the head position of the magnetic head 3 with an adjustment, which has been calculated based on the distance Ha as the offset (as one example, a value equal to the distance Ha), as a target value. However, as shown on the right in FIG. 17, in the vicinity of the point P2 described above, when the head position of the magnetic head 3 has been adjusted with an adjustment calculated based on the distance Ha as the offset as the target value, the center C3w of the recording element 3w will be displaced from the track center Ct of the desired data recording track by a distance Hc that is the difference between the distance Ha and the distance Hb (i.e., the recording element 3w will become off-track). This means that with the conventional recording/reproducing apparatus, there is the risk that proper recording will be difficult due to the write width of the magnetic signal on the data recording track being insufficient (i.e., due to the magnetic signal being written on only part of the width of the data recording track). Also, when the displacement (the distance Hc) described above is larger, there is the risk of a "side writing" phenomenon where a magnetic signal is written on a data recording track adjacent to the desired data recording track.

On the other hand, among recording/reproducing apparatuses that carry out tracking servo control using one offset per data recording track and are equipped with a continuous recording film-type magnetic recording medium (hereinafter referred to as a continuous recording film-type magnetic disk), unlike the recording/reproducing apparatus equipped with the discrete track-type magnetic recording medium described above, as one example, there are also apparatuses constructed so that an actual data recording track is formed (here, the expression "data recording track" refers to a part where a magnetic signal has been written by a write of a magnetic signal) at a position passed by the recording element 3w when the magnetic disk is rotated in a state where the center C3r of the reproducing element 3r has been positioned on a track center Ct of a virtual data recording track set by a servo pattern (as one example, the track center of a servo track). More specifically, as shown on the left in FIG. 18, for a recording/reproducing apparatus equipped with a continuous recording film-type magnetic disk 10D, when a magnetic signal is written using the recording element 3w in a state where the reproducing element 3r is positioned at the track center Ct of a virtual data recording track at the point P1, an actual data recording track will be formed with a position (the part shown by the dotted line L11a) that is the distance Ha from the track center Ct as the track center Ctx. Also, as shown on the right in FIG. 18, when a magnetic signal is written using the recording element 3w in a state where the reproducing element 3r is positioned at the track center Ct of a virtual data recording track at the point P2, an actual data recording track is formed with a position (the part shown by the dashed line L11b) that is the distance Hb from the track center Ct as the track center Ctx.

For the recording/reproducing apparatus equipped with the continuous recording film-type magnetic disk 10D described above, unlike the recording/reproducing apparatus equipped with the discrete track-type magnetic disk 10, the recording element 3w will not become positioned above a guard band part even if the center C3w of the recording element 3w becomes displaced from the track center Ct of a virtual data recording track set by a servo pattern. This means that the write width of magnetic signals on the magnetic disk 10D will not be insufficient, so that magnetic signals can be written with a sufficient width. Since the data recording tracks are formed at the parts where magnetic signals are written using the recording element 3w, there is also no risk of the "side writing" phenomenon described above. However, in a state where the pattern center Cp is displaced from the center of rotation Cr, if data is read from the magnetic disk 10D by carrying out tracking servo control using one offset per data recording track as in a conventional recording/reproducing apparatus, it is difficult to maintain a state where the reproducing element 3r is made on-track to a desired data recording track (i.e., a state where the center C3r of the reproducing element 3r is positioned at the track center Ctx of an actual data recording track formed by writing a magnetic signal using the recording element 3w).

More specifically, when the distance Ha described above is set as the offset for a predetermined data recording track, as shown on the left in FIG. 19, in the vicinity of the point P1 described above, the center C3r of the reproducing element 3r can be aligned with the track center Ctx (the position shown by the dotted line L11a in FIG. 19) of an actual data recording track (i.e., the reproducing element 3r can be made on-track to the actual data recording track) by adjusting the head position of the magnetic head 3 with an adjustment, which has been calculated based on the distance Ha as the offset (as one example, a value equal to the distance Ha), as the target value. However, as shown on the right in FIG. 19, in the vicinity of the point P2 described above, when the head position of the magnetic head 3 is adjusted with an adjustment, which has been calculated based on the distance Ha as the offset, as the target value, the center C3r of the reproducing element 3r will become displaced from the track center Ctx (the position shown by the dashed line L11b in FIG. 19) of the actual data recording track by a distance Hc that is the difference between the distance Ha and the distance Hb to become positioned at the position shown by the dotted line L11a (i.e., the reproducing element 3r will become off-track from the actual data recording track). As a result, there is the risk that proper reproducing will be difficult due to the read width for reading a magnetic signal from the data recording track being insufficient (i.e., due to a magnetic signal being read from only part of the width of the actual data recording track). When the displacement (the distance Hc) described above is larger, there is also the risk of the "side reading" phenomenon where a magnetic signal is read from a data recording track adjacent to the desired data recording track.

Such problems due to displacements between the center of rotation Cr and the pattern center Cp of a magnetic disk (i.e., the problems of recording errors and side writing for the discrete track-type magnetic disk 10 and the problems of reproducing errors and side reading for the continuous recording film-type magnetic disk 10D) become increasingly serious as the recording density of the magnetic disk increases and as the size of the magnetic disk is miniaturized. Since it is extremely difficult to reduce the displacement between the center of rotation Cr and the pattern center Cp, it is necessary to solve the problems described above that occur when a displacement occurs between the center of rotation Cr and the pattern center Cp.

The present invention was conceived in view of the problems described above and it is a principal object of the present invention to provide a recording/reproducing apparatus and a tracking servo control method that can reliably make a reproducing element and a recording element on-track to a data recording track, even when the pattern center of data track patterns and the like is displaced from the center of rotation of a magnetic recording medium.

A recording/reproducing apparatus according to the present invention includes: a rotary-type magnetic recording medium including a track pattern in which concentric or spiral data recording tracks are provided; a composite magnetic head including a reproducing element that carries out a read of a magnetic signal from the magnetic recording medium and a recording element that carries out a write of a magnetic signal on the magnetic recording medium; a control unit that moves the magnetic head over the magnetic recording medium to carry out tracking servo control on one element out of the reproducing element and the recording element to keep the one element on one of the data recording tracks; and a storage unit that stores offset information capable of specifying an offset for calculating an adjustment used to adjust a head position of the magnetic head during the tracking servo control, wherein the storage unit stores information that specifies at least two different offsets per revolution of the data recording tracks as the offset information, and during the tracking servo control on the one element, the control unit adjusts the head position by changing the adjustment at least once per revolution of the magnetic recording medium in accordance with offsets specified based on the offset information.

A tracking servo control method according to the present invention moves a composite magnetic head including a reproducing element, which carries out a read of a magnetic signal from a rotary-type magnetic recording medium with a track pattern in which concentric or spiral data recording tracks are provided, and a recording element, which carries out a write of a magnetic signal on the magnetic recording medium, over the magnetic recording medium to keep one element out of the reproducing element and the recording element on one of the data recording tracks, wherein during tracking servo control on the one element, a head position of the magnetic head is adjusted by changing, at least once per revolution of the magnetic recording medium, an adjustment used to adjust the head position of the magnetic head in accordance with offsets specified based on offset information capable of specifying at least two different offsets.

According to the recording/reproducing apparatus and the tracking servo control method, during tracking servo control on one element out of the reproducing element and the recording element of a composite magnetic head, the control unit adjusts the head position of the magnetic head by changing the adjustment at least once per revolution of the magnetic recording medium in accordance with an offset specified based on offset information stored in the storage unit. By doing so, according to the recording/reproducing apparatus and tracking servo control method, in a recording/reproducing apparatus equipped with a discrete track-type magnetic recording medium, unlike the conventional recording/reproducing apparatus that carries out tracking servo control using a single adjustment (offset) per data recording track, by adjusting the head position of the magnetic head with an adjustment calculated based on an offset corresponding to each recording/reproducing position along the circumferential direction of the track pattern as a target value, the recording element can be reliably made on-track to the data recording track around an entire revolution of the magnetic recording medium.

Accordingly, it is possible to avoid a situation where the write width of a magnetic signal on a data recording track becomes insufficient (i.e., where recording errors occur) and to therefore write a magnetic signal onto a data recording track with a sufficient write width. As a result, during the reproducing of the magnetic signal, a reproducing signal with a sufficiently high output level can be obtained. By doing so, it is possible to avoid reproducing errors and to properly reproduce the data. It is also possible to avoid the side writing phenomenon and to reliably record data on only the desired data recording track. On the other hand, for a recording/reproducing apparatus equipped with a continuous recording film-type magnetic recording medium, it is possible to adjust the head position of the magnetic head with an adjustment, which has been calculated based on an offset corresponding to each recording/reproducing position along the circumferential direction of the track pattern, as a target value to reliably make the reproducing element on-track to a data recording track for an entire revolution of the magnetic recording medium. Accordingly, since it is possible to avoid a situation where the read width of a magnetic signal from a data recording track becomes insufficient (i.e., where reproducing errors occur), it is possible to read a magnetic signal from a data recording track with a sufficient read width and thereby obtain a reproducing signal with a sufficiently high output level. By doing so, it is possible to properly reproduce data. Also, it is possible to avoid the side reading phenomenon and to reliably read data from only a desired data recording track.

In this recording/reproducing apparatus, the storage unit may store, as the offset information, plural offsets set corresponding to plural control regions produced by dividing the magnetic recording medium in both a radial direction and a circumferential direction of the track pattern, and during the tracking servo control on the one element, to keep the one element on a data recording track included in a control region out of the control regions, the control unit may adjust the head position with the adjustment calculated based on the offset set corresponding to the control region.

By doing so, according to this recording/reproducing apparatus, unlike for example a construction where the adjustment of the head position of the magnetic head is continuously and smoothly changed in infinite steps in accordance with rotation of the swing arm at each rotational position on the magnetic recording medium, the respective adjustments for the control regions can be easily calculated based on offsets provided separately for the control regions. As a result, it is possible to carry out tracking servo control at a sufficiently high speed corresponding to the degree to which tracking servo control by the control unit is simplified. Accordingly, even when the magnetic recording medium is rotated at high speed, the magnetic head (the reproducing element or the recording element) can be reliably made on-track to a desired data recording track.

Alternatively in this recording/reproducing apparatus, the storage unit may store, as the offset information, plural offsets set corresponding to part of plural control regions produced by dividing the magnetic recording medium in both a radial direction and a circumferential direction of the track pattern, during the tracking servo control on the one element, to keep the one element on a data recording track included in a control region out of the part of the control regions, the control unit may adjust the head position using the adjustment calculated based on the offset set corresponding to the control region, and during the tracking servo control on the one element, to keep the one element on a data recording track included in a control region out of the control regions aside from the part of the control regions, the control unit may adjust the head position using the adjustment calculated based on an offset calculated corresponding to the control region out of the control regions aside from the part of the control regions according to an interpolation process using the offset information.

By doing so, a smaller number of offsets are stored in the storage unit (that is, the data size of the offset information is reduced), and therefore it is possible to construct the storage unit of a storage element with a corresponding reduction in storage capacity. Accordingly, it is possible to sufficiently reduce the manufacturing cost of the recording/reproducing apparatus.

In this recording/reproducing apparatus, the control unit may be constructed so as to be capable of carrying out an offset information obtaining process that generates the offset information and stores the offset information in the storage unit, the offset information obtaining process including: a standard offset obtaining process that obtains standard offsets corresponding to same-rotational-radius positions at a predetermined pitch on the magnetic recording medium; a separation distance obtaining process that obtains, corresponding to rotational positions at a predetermined pitch along the direction of rotation of the magnetic recording medium, separation distances along a rotational radius (i.e., a radius measured from the center of rotation) of the magnetic recording medium between a predetermined same-pattern-radius position on the magnetic recording medium and a predetermined same-rotational-radius position out of the same-rotational-radius positions; and an offset specifying process that specifies an offset corresponding to a desired recording/reproducing position on the magnetic recording medium based on the standard offset corresponding to each same-rotational-radius position and the separation distance corresponding to each rotational position, wherein the control unit may generate the offset information based on the specified offsets.

Note that the expression "same-rotational-radius positions" in the present specification refers to "positions on a magnetic recording medium where the distance from the center of rotation of the magnetic recording medium is equal", or in other words, "a ring-shaped region on a magnetic recording medium that is centered on the center of rotation".

Also, the expression "same-pattern-radius positions" in the present specification refers to "positions on a magnetic recording medium where the distance from the pattern center of the track pattern is equal", or in other words, "a ring-shaped region on a magnetic recording medium that is centered on the pattern center".

By doing so, according to this recording/reproducing apparatus, when the number of control regions per magnetic recording medium is high, for example, compared to a recording/reproducing apparatus constructed so as to generate the offset information by separately measuring an offset in each control region, it is possible to sufficiently reduce the time required to generate the offset information.

Alternatively, in this recording/reproducing apparatus, the control unit may be constructed so as to be capable of carrying out an offset information obtaining process that generates the offset information and stores the offset information in the storage unit, the offset information obtaining process including: a standard offset obtaining process that obtains standard offsets corresponding to same-pattern-radius positions at a predetermined pitch on the magnetic recording medium; a separation distance obtaining process that obtains, corresponding to rotational positions at a predetermined pitch along the direction of rotation of the magnetic recording medium, separation distances along a pattern radius direction of the track pattern between a predetermined same-rotational-radius position on the magnetic recording medium and a predetermined same-pattern-radius position out of the same-pattern-radius positions; and an offset specifying process that specifies an offset corresponding to a desired recording/reproducing position on the magnetic recording medium based on the standard offset corresponding to each same-pattern-radius position and the separation distance corresponding to each rotational position, wherein the control unit may generate the offset information based on the specified offsets.

By doing so, according to this recording/reproducing apparatus, when the number of control regions per magnetic recording medium is high, for example, compared to a recording/reproducing apparatus constructed so as to generate the offset information by separately measuring an offset in each control region, it is possible to sufficiently reduce the time required to generate the offset information.

In this recording/reproducing apparatus, during the standard offset obtaining process, the control unit may obtain the standard offsets in association with the track numbers, during the separation distance obtaining process, the control unit may maintain a state where the magnetic head is positioned at the predetermined same-rotational-radius positions while rotating the magnetic recording medium, read sector numbers and track numbers from each sector at the predetermined same-rotational-radius positions via the reproducing element, and, with sectors at the predetermined same-rotational-radius positions as the predetermined rotational positions, based on a track number, as the predetermined same-pattern-radius position, of a standard track and on a track number read for each sector, obtain a number of tracks between each sector and the standard track as the separation distances, and during the offset specifying process, the control unit may specify, as an offset of the desired recording/reproducing position, the standard offset associated with a track number of a track separated from the desired recording/reproducing position by a number of tracks obtained as the separation distance of a sector positioned in a same direction from the pattern center as the desired recording/reproducing position out of the sectors at the predetermined same-rotational-radius positions.

Note that the expression "track" in the present specification includes both servo tracks set by servo patterns formed in servo pattern regions and data recording tracks formed in data track pattern regions. Accordingly, the expression "track number" in the present specification includes both track numbers set for servo tracks and track numbers set for data recording tracks. Similarly, the expression "number of tracks" in the present specification refers to a number of the servo tracks described above or a number of the data recording tracks.

By doing so, according to this recording/reproducing apparatus, unlike for example a construction that measures actual distances on a magnetic recording medium, during the separation distance obtaining process for the present invention it is possible to measure the separation distances using a mechanism provided in a typical recording/reproducing apparatus. This means that there is no need to provide a dedicated mechanism to measure the actual distances and it is therefore possible to reduce the manufacturing cost of the recording/reproducing apparatus.

In this recording/reproducing apparatus, the control unit may be constructed so as to be capable of carrying out an offset information obtaining process that generates the offset information and stores the offset information in the storage unit, and in the offset information obtaining process, the control unit may separately carry out measurement of all of the offsets to be stored in the storage unit for each corresponding control region and generates the offset information.

By doing so, according to this recording/reproducing apparatus, it is possible to construct the offset information using correct offsets for an actual apparatus that have been obtained by actual measurement. Accordingly, during tracking servo control, since it is possible to correctly adjust the head position in the control regions by calculating appropriate adjustments for the actual apparatus, it is possible to reliably avoid recording errors, reproducing errors, side writing phenomena, and side reading phenomena.

In this recording/reproducing apparatus, the control unit may be constructed so as to be capable of carrying out an offset information obtaining process that generates the offset information and stores the offset information in the storage unit, and in the offset information obtaining process, the control unit may separately carry out measurement of part of all of the offsets to be stored in the storage unit for each corresponding control region, calculate offsets out of all of the offsets aside from the part of the offset by carrying out an interpolation process using the part of the offsets, and generate the offset information based on the measured offsets and the calculated offsets.

By doing so, according to this recording/reproducing apparatus, compared to a hard disk drive constructed to measure offsets for all of the control regions, it is possible to reduce the time required to generate the offset information in keeping with the reduction in the number of measurements of offsets per magnetic recording medium.

It should be noted that the disclosure of the present invention relates to a content of Japanese Patent Application 2007-044926 that was filed on 26 Feb. 2007 and the entire content of which is herein incorporated by reference.

BRIEF DESCRIPTION OF THE DRAWINGS

These and other objects and features of the present invention will be explained in more detail below with reference to the attached drawings, wherein:

FIG. 12 is a cross-sectional view of another magnetic disk;

FIG. 13 is a cross-sectional view of another magnetic disk;

FIG. 14 is composed of two plan views, with the left plan view showing a magnetic head and a magnetic disk in a state where the head position has been adjusted with an adjustment calculated based on a distance as a target value when carrying out tracking so that the reproducing element of the magnetic head is positioned on the track center of an actual data recording track in a predetermined sector, and the right plan view showing the magnetic head and the magnetic disk in a state where the head position has been adjusted with an adjustment calculated based on a distance as a target value when carrying out tracking so that the reproducing element is positioned on the track center of an actual data recording track in another predetermined sector;

DESCRIPTION OF THE PREFERRED EMBODIMENTS

Preferred embodiments of a recording/reproducing apparatus and a tracking servo control method according to the present invention will now be described with reference to the attached drawings.

First, the construction and operating principles of the recording/reproducing apparatus according to the present invention will be described with reference to the drawings.

Figure 1:
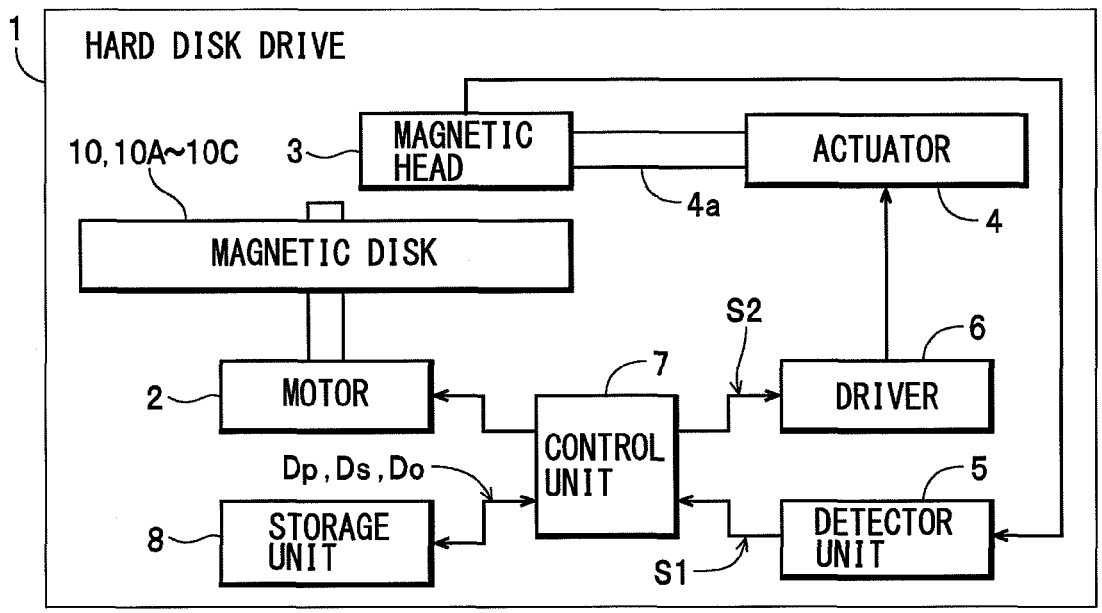
FIG. 1 is a schematic diagram showing the construction of a hard disk drive.
Figure 2:
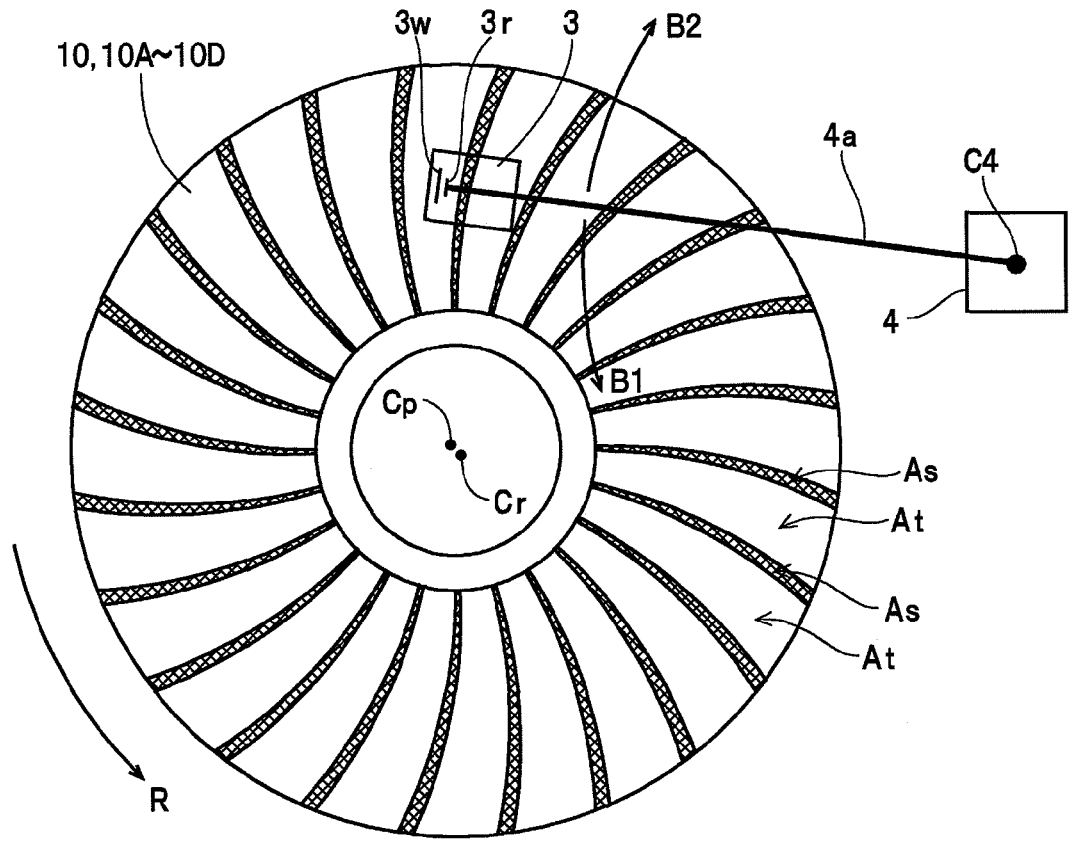
FIG. 2 is a plan view of a magnetic disk.
Figure 3:
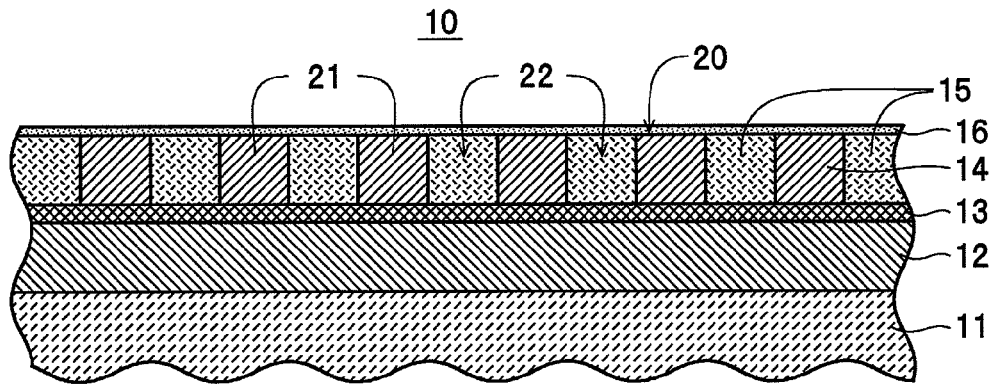
FIG. 3 is a cross-sectional view of the magnetic disk.

A hard disk drive 1 shown in FIG. 1 is one example of a recording/reproducing apparatus according to the present invention, includes a motor 2, a magnetic head 3, an actuator 4, a detector unit 5, a driver 6, a control unit 7, a storage unit 8, and a magnetic disk 10, and is constructed so as to be capable of recording and reproducing various types of data. The magnetic disk 10 is a discrete track medium (one example of a patterned medium) as one example of a magnetic recording medium for the present invention, and as shown in FIG. 2, is formed in an overall disk shape, is attached to a rotational shaft of the motor 2, and is disposed inside a housing of the hard disk drive 1 together with the magnetic head 3 and the like. As shown in FIG. 3, the magnetic disk 10 is constructed by forming a soft magnetic layer 12, an intermediate layer 13, and a magnetic layer 14 in the mentioned order on a glass substrate 11 and as one example is constructed so as to be capable of recording data by perpendicular recording.

As one example, the magnetic layer 14 constructs a convex/concave pattern 20 in which are formed plural convexes 21 (recording regions), which are entirely formed of magnetic material from protruding end parts (the upper ends in FIG. 3) to base end parts (the lower ends in FIG. 3) thereof, and plural concaves 22 (non-recording regions), which are located between adjacent convexes 21. The concaves 22 of the convex/concave pattern 20 are filled with a non-magnetic material 15 such as $SiO_2$, C (carbon), or a resin material to make the surface of the magnetic disk 10 smooth. In addition, on this magnetic disk 10, a protective layer 16 (DLC film) of diamond-like carbon (DLC) or the like is formed with a thickness of around 2 nm on the surfaces of the non-magnetic material 15 that fills the concaves 22 and the magnetic layer 14 (i.e., the convexes 21). A lubricant (as one example, a Fomblin lubricant) is also applied onto the surface of the protective layer 16 to protect both the magnetic head 3 and the magnetic disk 10 from damage.

Note that the expression "recording regions" (in this example, the convexes 21) given above refers to regions constructed so as to retain a recorded magnetic signal in a readable manner (that is, regions constructed so as to have the ability to retain a magnetic signal in a readable manner). Similarly, the expression "non-recording regions" (in this example, the concaves 22) given above refers to regions constructed so that the ability thereof to retain a magnetic signal in a readable manner is lower than that of the recording regions, or regions constructed so as not to effectively have such ability. More specifically, the "non-recording regions" in this specification are regions from which a smaller magnetic field is emitted than that emitted from the recording regions in a state where a magnetic signal has been recorded, or regions from which effectively no magnetic field is emitted.

As one example, the glass substrate 11 is formed with a thickness of around 0.6 mm by polishing the surface of a glass plate. Note that the substrate used to form the magnetic disk 10 is not limited to a glass substrate and it is possible to use a substrate formed in a disk-like shape using various types of non-magnetic material such as aluminum and ceramics. The soft magnetic layer 12 is formed in a thin film with a thickness of around 100 nm to 200 nm, inclusive by sputtering a soft magnetic material such as CoZrNb alloy. The intermediate layer 13 functions as an underlayer for forming the magnetic layer 14 and is formed as a thin film with a thickness of around 40 nm by sputtering an intermediate layer forming material such as Ru, Cr or a non-magnetic CoCr alloy. As described earlier, the magnetic layer 14 is a layer that constructs the convex/concave pattern 20 (the data track patterns 20t and the servo patterns 20s shown in FIG. 4) and as one example the concaves 22 are formed by etching a layer produced by sputtering CoCrPt alloy.

As shown in FIG. 2, in this magnetic disk 10, the servo pattern regions As are provided between the data track pattern regions At and are defined so that the data track pattern regions At and the servo pattern regions As are alternately disposed in the direction of rotation of the magnetic disk 10 (i.e., the direction of the arrow R). Note that in the present specification, each region sandwiched by two data track pattern regions At aligned in the direction of rotation (i.e., each region from a trailing end in the direction of rotation of a data track pattern region At to a leading end in the direction of rotation of the next data track pattern region At) is regarded as a servo pattern region As. Also, the ends in the direction of rotation of the data track pattern regions At are set as coinciding with virtual segments (linear or arc-shaped segments along the radial direction of the magnetic disk 10) that join the respective ends in the direction of rotation of plural data recording tracks (the convexes 21) formed in such data recording regions.

Figure 4:
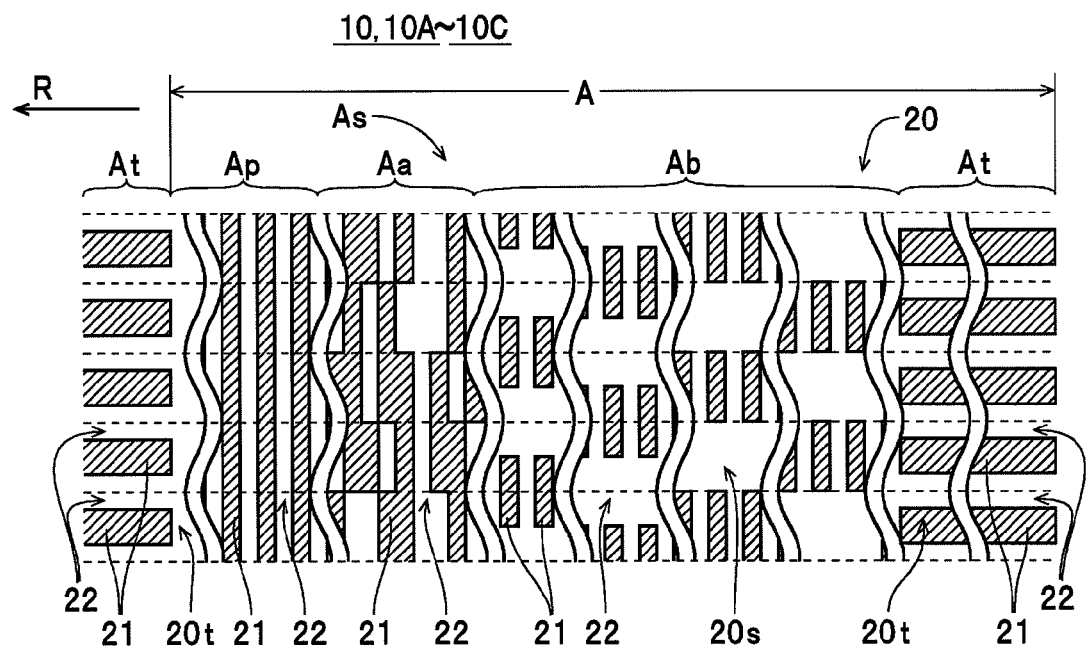
FIG. 4 is a plan view of a data track pattern region and servo pattern regions on the magnetic disk.

Also, as shown in FIG. 4, on the magnetic disk 10, a "sector" is defined on each data recording track by a pair of a servo pattern region As and a data track pattern region At that are adjacent in the circumferential direction of the data track patterns 20t (i.e., the direction of rotation of the magnetic disk 10) or in other words, by the range indicated by the arrow A in FIG. 4. That is, the number of sectors defined on the magnetic disk 10 (in this example, ten million) is given by multiplying the number of servo pattern regions As or the number of data track pattern regions At per revolution (as one example, two hundred) by the number of tracks (the number of data recording tracks: as one example, fifty thousand). On the magnetic disk 10, the track pitch (that is, the distance between track centers of tracks that are adjacent in the radial direction) is equal for both servo tracks defined by the servo patterns 20s formed in the servo pattern regions As and the data recording tracks in the data track patterns 20t formed in the data track pattern regions At. Accordingly, on the magnetic disk 10, the same number (i.e., fifty thousand) of servo tracks as data recording tracks are present.

Also, as described later, during tracking servo control by the control unit 7, as one example, the head position is adjusted with a region where plural sectors (as one example, ten sectors) that are consecutive in the circumferential direction of the data track patterns 20t (i.e., the direction of rotation of the magnetic disk 10) are grouped together for several tens of tracks (as one example, fifty tracks) that are consecutive in the radial direction of the data track patterns 20t (that is, a total of five hundred sectors) set as a "control region" for the present invention. In the hard disk drive 1, the head position is adjusted using the same adjustment, which is calculated based on a single offset, as a target value for every sector in the same control region.

The hard disk drive 1 equipped with the magnetic disk 10 is constructed so that the magnetic disk 10 is rotated at a fixed angular velocity by the motor 2 in accordance with control by the control unit 7. Accordingly, as shown in FIG. 2, on the magnetic disk 10, the length of each data track pattern region At along the direction of rotation of the magnetic disk 10 and the length of each servo pattern region As along the direction of rotation (that is, the length of each sector) are set so as to increase as the distance from the pattern center Cp of the data track patterns 20t increases (i.e., the data track pattern regions At and the servo pattern regions As are set so as to widen from an inner periphery region toward an outer periphery region) in proportion to the length of a part of the magnetic disk 10 that passes below the magnetic head 3 per unit time. As a result, the length of each sector along the direction of rotation of the magnetic disk 10 is set so as to increase as the distance from the pattern center Cp of the data track patterns 20t to the sector increases (i.e., sectors in the outer periphery are longer than sectors in the inner periphery).

Also, as shown in FIG. 4, a data track pattern 20t is formed in each data track pattern region At. Note that the obliquely shaded regions in FIG. 4 show formation positions of the convexes 21 ("recording regions") in the convex/concave pattern 20. In this example, the data track patterns 20t inside the data track pattern regions At are composed of plural convexes 21 (long belt-shaped convexes 21 that are continuously formed along the direction of rotation of the magnetic disk 10 and are elongated in the direction of rotation) that construct a large number of data recording tracks that are concentric or spiral about the pattern center Cp (see FIG. 2) and are disposed a predetermined pitch apart, and plural concaves 22 (the concaves 22 between the convexes 21 or "inter-track concaves") that construct guard band parts. As one example, the convexes 21 and the concaves 22 inside the data track pattern regions At are set so that the respective lengths thereof along the radial direction are substantially equal and are formed so that the formation pitch of the convexes 21 (that is, the track pitch of the data recording tracks) and the length of the convexes 21 in the radial direction of the magnetic disk 10 (that is, the lengths in the radial direction of the data recording tracks and the guard band parts) are substantially equal across the entire range from the inner periphery of the magnetic disk 10 to the outer periphery.

In addition, in each servo pattern region As, the convex/concave pattern 20 (i.e., a servo pattern 20s) is formed with plural convexes 21 and plural concaves 22 that construct a variety of servo patterns used for tracking servo control. More specifically, a preamble pattern region Ap in which a preamble pattern is formed by the servo pattern 20s, an address pattern region Aa in which an address pattern is formed by the servo pattern 20s, and a burst pattern region Ab in which burst patterns are formed by the servo pattern 20s are defined inside each servo pattern region As. Note that since the functions of the patterns inside each servo pattern region As are well-known, description thereof is omitted.

Figure 6:
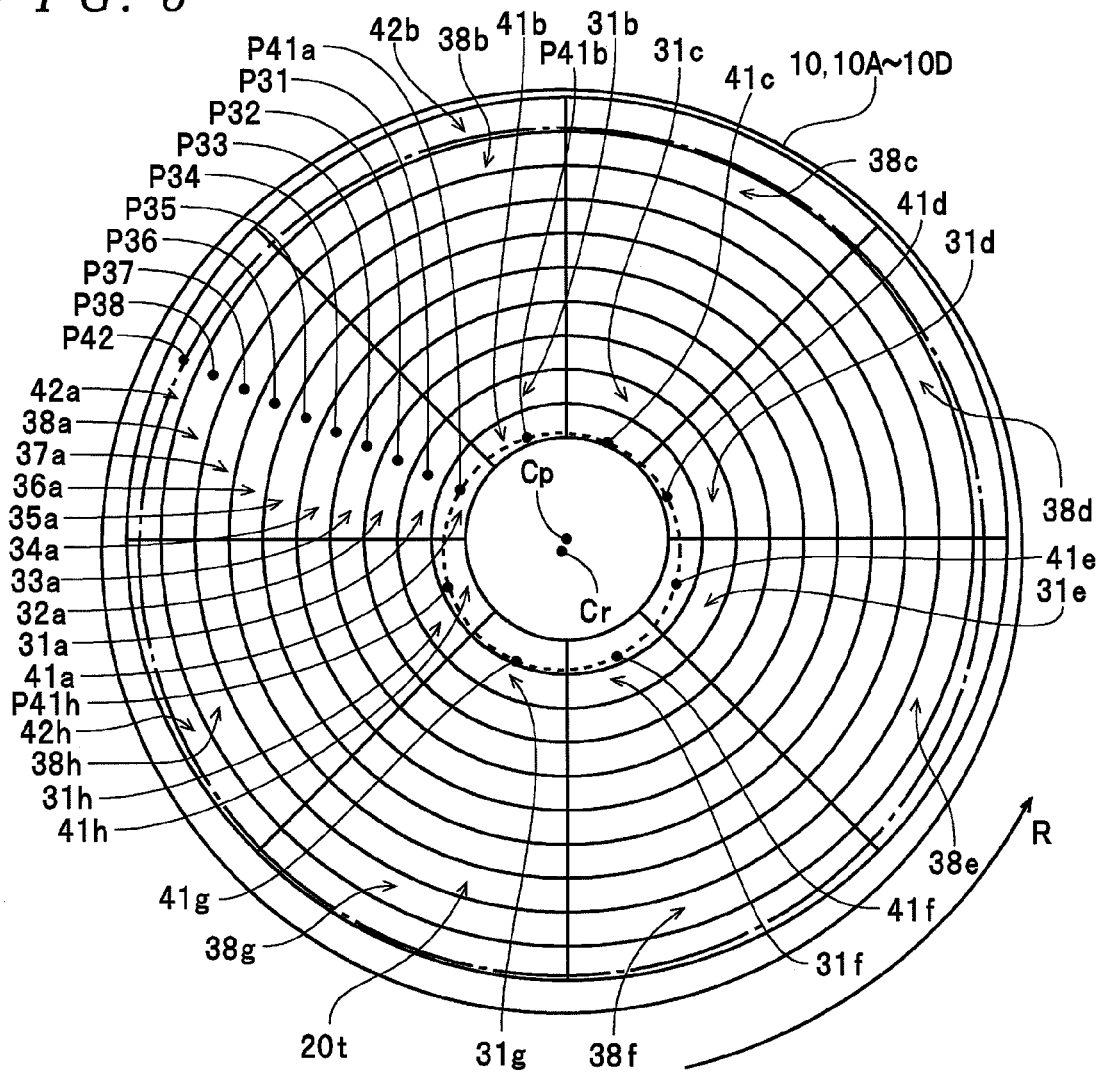
FIG. 6 is a plan view of a magnetic disk which is useful in explaining a state where a pattern center is displaced from a center of rotation.
Figure 15:
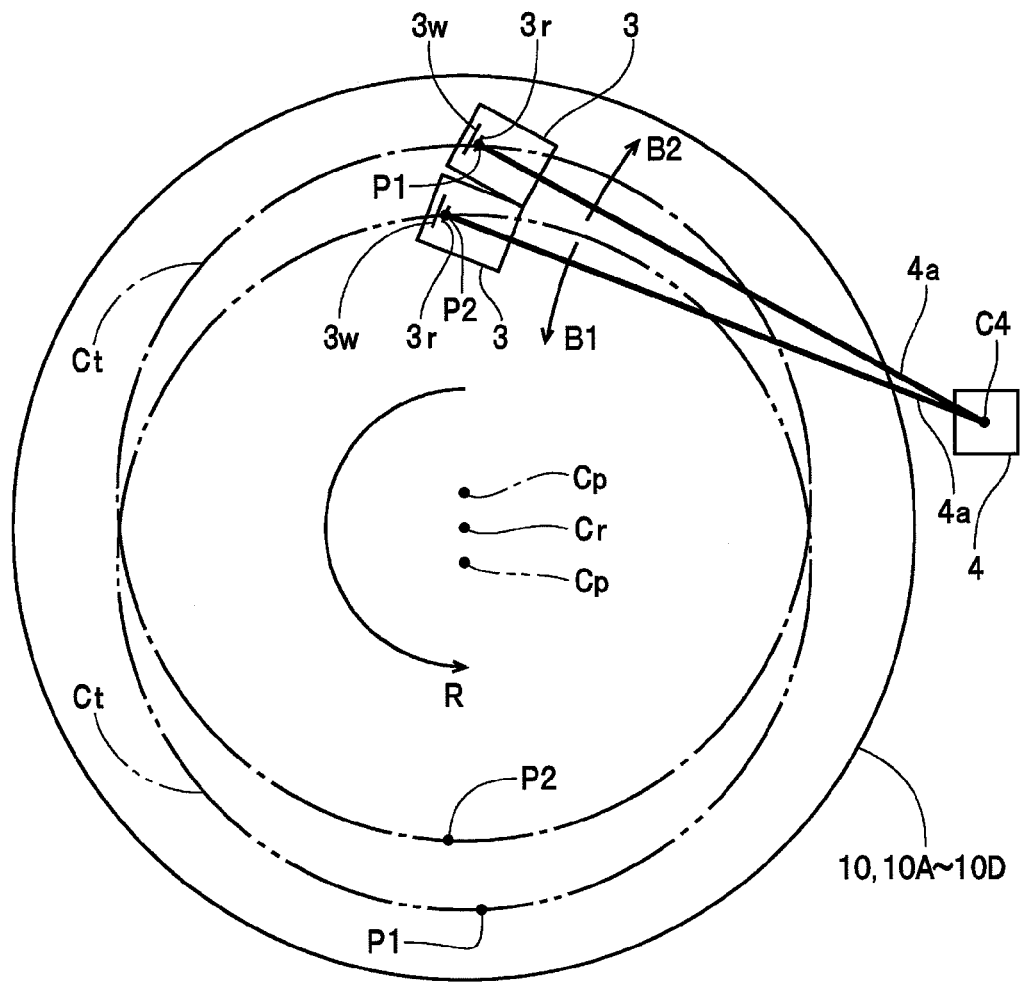
FIG. 15 is a plan view of a magnetic disk and a magnetic head useful in explaining the movement of the magnetic head in a state where the center of rotation and the pattern center are displaced.

The motor 2 rotates the magnetic disk 10 at a constant velocity, for example 7200 rpm, in accordance with control by the control unit 7. Here, in the hard disk drive 1, as shown in FIGS. 2, 6, and 15, an extremely small displacement of around 30 μm to 50 μm occurs between the center of rotation Cr of the magnetic disk 10 (the center of the rotational shaft of the motor 2) and the pattern center Cp of the data track patterns 20t and the servo patterns 20s due to manufacturing error.

As shown in FIG. 2, the magnetic head 3 is a composite magnetic head where a reproducing element 3r that corresponds to a "reproducing element" for the present invention and a recording element 3w that corresponds to a "recording element" for the present invention are formed on a base surface of a slider. The magnetic head 3 carries out reads of servo data from the servo pattern regions As of the magnetic disk 10, magnetic writes of data in the data track pattern regions At, and reads of data that has been magnetically written in the data track pattern regions At. The magnetic head 3 is attached via the swing arm 4a to the actuator 4. During the recording and reproducing of data on the magnetic disk 10, the magnetic head 3 is moved over the magnetic disk 10 toward the inner periphery or the outer periphery by rotating the swing arm 4a in the direction of the arrows B1, B2 about a center of rotation C4 using the actuator 4.

Figure 5:
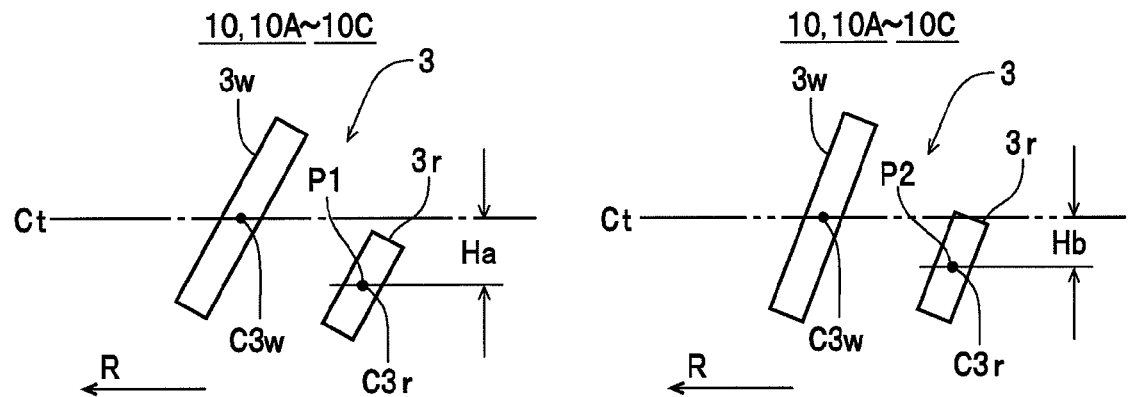
FIG. 5 is composed of two plan views, with the left plan view showing a magnetic head and a magnetic disk in a state where the recording element of a magnetic head is positioned on a track center of a data recording track in a predetermined sector and the right plan view showing a magnetic head and a magnetic disk in a state where the recording element of a magnetic head is positioned on a track center of a data recording track in another predetermined sector.

As one example, on the magnetic head 3, the recording element 3w is provided at the front end of the slider and the reproducing element 3r is provided at the front end of the slider but closer to the base end (on the swing arm 4a side) than the recording element 3w. Also, as shown in FIG. 5, the reproducing element 3r and the recording element 3w are formed on the magnetic head 3 so that the center C3w of the recording element 3w (the center of the dimension of the recording element 3w that corresponds to the radial direction of the medium: the center of the length in the direction of seek operations) is separated from the center C3r of the reproducing element 3r (the center of the dimension of the reproducing element 3r that corresponds to the radial direction of the medium: the center of the length in the direction of seek operations) by a predetermined distance in the direction in which the swing arm 4a extends. Note that in the drawings referred to by this specification, for ease of understanding the present invention, the lengths of the various parts of the reproducing element 3r and the recording element 3w, the distance between the reproducing element 3r and the recording element 3w, and the like are shown differently to the actual lengths and distance.

According to a driving current supplied from the driver 6 under the control of the control unit 7, the actuator 4 swings (rotates) the swing arm 4a to move the magnetic head 3 to a desired recording/reproducing position on the magnetic disk 10. The detector unit 5 obtains (detects) a servo signal S1 from an output signal outputted by the magnetic head 3 and outputs the servo signal S1 to the control unit 7. The driver 6 supplies the driving current to the actuator 4 in accordance with a control signal S2 outputted from the control unit 7 to make the magnetic head 3 on-track to the desired data recording track.

The control unit 7 carries out overall control over the hard disk drive 1. The control unit 7 is one example of a "control unit" for the present invention and based on the servo signal S1 outputted from the detector unit 5 and servo control data Ds and offset information Do stored in the storage unit 8, the control unit 7 controls the driver 6 (i.e., the control unit 7 carries out a tracking servo control process). In addition, the control unit 7 carries out an offset information obtaining process that obtains an offset corresponding to each recording/reproducing position on the magnetic disk 10 as described later to generate the offset information Do. The storage unit 8 stores a measuring process program Dp (a program for carrying out the offset information obtaining process mentioned above), servo control information Ds, the offset information Do, an operation program of the control unit 7, and the like.

Figure 16:
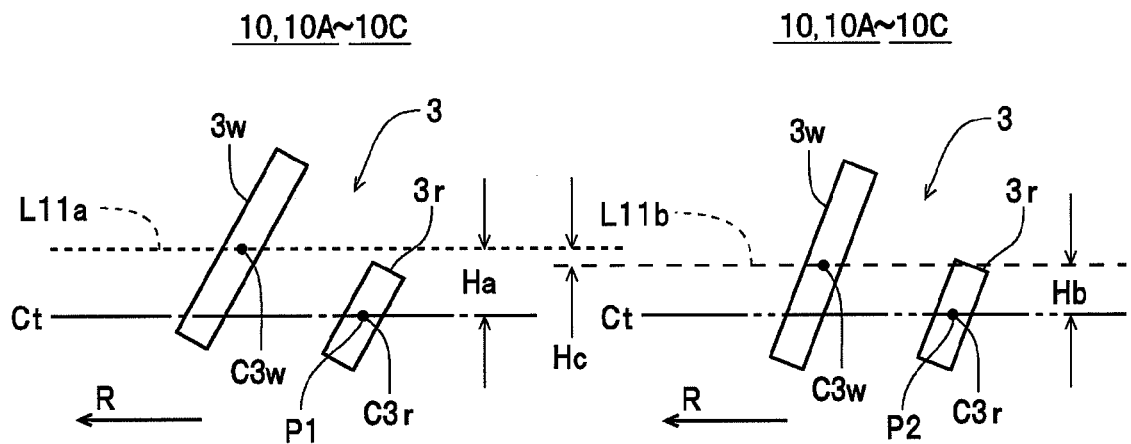
FIG. 16 is composed of two plan views, with the left plan view showing the magnetic head and the magnetic disk in a state where the reproducing element of the magnetic head has been positioned on the track center of a data recording track in a predetermined sector and the right plan view showing the magnetic head and the magnetic disk in a state where the reproducing element has been positioned on the track center of a data recording track in another predetermined sector.
Figure 17:
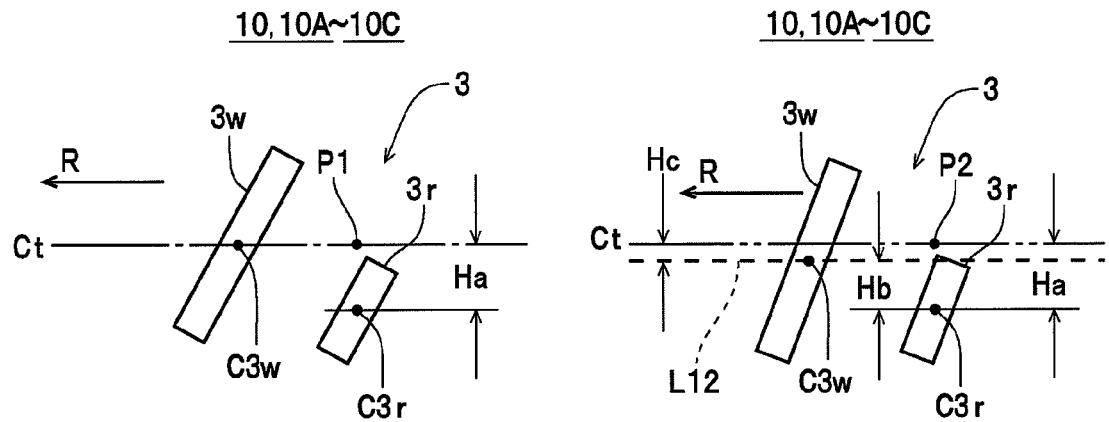
FIG. 17 is composed of two plan views, with the left plan view showing the magnetic head and the magnetic disk in a state where the head position has been adjusted with an adjustment calculated based on a distance as a target value when carrying out tracking so that the recording element of the magnetic head is positioned on the track center of a data recording track in a predetermined sector and the right plan view showing the magnetic head and the magnetic disk in a state where the head position has been adjusted with an adjustment calculated based on a distance as a target value when carrying out tracking so that the recording element of the magnetic head is positioned on the track center of a data recording track in another predetermined sector.

In the hard disk drive 1, as described earlier, since the reproducing element 3r and the recording element 3w are disposed apart in the direction in which the swing arm 4a extends, when the magnetic head 3 has moved above a predetermined data recording track in the outer periphery, for example, of the magnetic disk 10 as shown on the left in FIG. 16 for example, the track center Ct (center line) of the data recording track will intersect a line that joins the center C3w of the recording element 3w and the center C3r of the reproducing element 3r (i.e., a line that is parallel to the direction in which the swing arm 4a extends) or in other words, a skew angle will be produced. Accordingly, when the reproducing element 3r is being made on-track to a predetermined data recording track in the outer periphery (i.e., when the center C3r of the reproducing element 3r has been aligned with the track center Ct of the data recording track), the center C3w of the recording element 3w will be positioned away from the track center Ct (i.e., the recording element 3w will be off-track). Here, the amount by which the recording element 3w is off-track (i.e., the offset), or in other words, the distance along the radial direction between the center C3r of the reproducing element 3r and the center C3w of the recording element 3w when a skew angle has been produced, will differ as described earlier according to the magnitude of the skew angle.

This means that if the pattern center Cp is displaced from the center of rotation Cr (i.e., a state where the magnetic disk 10 is eccentric with respect to the motor 2), for example, when the magnetic disk 10 rotates in a state where the center C3r of the reproducing element 3r is aligned with the track center Ct of the data recording track, the offset described above will continuously change during one revolution of the magnetic disk 10. Accordingly, to carry out tracking servo control that makes the reproducing element 3r and the recording element 3w on-track to a desired data recording track during both a read of servo data or recorded data by the reproducing element 3r from each recording/reproducing position on the magnetic disk 10 and a write of data by the recording element 3w at each recording/reproducing position, it is necessary to measure the offset (i.e., the distance between the center C3r of the reproducing element 3r and the center C3w of the recording element 3w) corresponding to each recording/reproducing position along the direction of rotation of the magnetic disk 10 across the entire range from the inner periphery to the outer periphery of the magnetic disk 10 and to store the measurement results in association with the recording/reproducing positions as the offset information Do.

Here, although it is preferable to provide offset information Do in which one offset is recorded per sector, for example, and to carry out tracking servo control based on such offset information Do, as described earlier, since ten million sectors are present on the magnetic disk 10, the data size of the offsets in the offset information Do becomes extremely large, which makes tracking servo control complex and makes a large-capacity storage unit 8 necessary. In reality, the offset described above will be substantially equal for several sectors that are adjacent in the direction of rotation of the magnetic disk 10 and in several tens of sectors that are adjacent in the radial direction of the magnetic disk 10. Accordingly, in the hard disk drive 1, as described earlier, a construction is used where a region in which ten sectors that are consecutive in the direction of rotation are grouped together on fifty tracks (in this example, five hundred sectors are grouped) is set as a "control region" for the present invention and tracking servo control (tracking servo control that uses the same offset for each sector in a given control region) is carried out based on the offset information Do where one offset is recorded per control region. This corresponds to an example of where 200/10=20 offsets per revolution are used as "at least two different offsets per revolution of the data recording tracks" for the present invention. By storing offsets in this way, it is possible to store the offset information Do and the like even in a storage unit 8 with a comparatively small capacity.

Note that in the following description, it is assumed that offset information Do that can specify an offset corresponding to each control region has been generated by an offset information obtaining process described later and has been stored in the storage unit 8. In the hard disk drive 1, a construction is used where the distance along the radial direction between (i) the center C3w of the recording element 3w in a state where the center C3r of the reproducing element 3r has been positioned on the track center Ct of a data recording track and (ii) the track center Ct is regarded as the offset and when data is recorded on the magnetic disk 10 using the recording element 3w, the head position of the magnetic head 3 is adjusted with an adjustment, which has been calculated based on such offset (as one example, the adjustment is equal to the offset), as the target value. This is one example of a construction where the recording element 3w corresponds to the "one element" for the present invention.

Here, as shown on the left in FIG. 16, for example, the distance Ha is set as the offset for a control region where the center C3w of the recording element 3w is separated by the distance Ha from the track center Ct of a data recording track when the center C3r of the reproducing element 3r is aligned with the track center Ct at the point P1. Also, as shown on the right in FIG. 16, the distance Hb is set as the offset for a control region where the center C3w of the recording element 3w is separated by the distance Hb from the track center Ct of a data recording track when the center C3r of the reproducing element 3r is aligned with the track center Ct at the point P2. Accordingly, based on the servo control information Ds and the offset information Do stored in the storage unit 8, when writing data (a magnetic signal) onto a data recording track (a convex 21) in a control region that includes the point P1 described above, as shown on the left in FIG. 5, the control unit 7 outputs, to the driver 6, a control signal S2 that adjusts the head position of the magnetic head 3 with an adjustment that has been calculated based on the distance Ha set as the offset (in this example, the adjustment is equal to the distance Ha) as the target value. By doing so, as shown in FIG. 5, the center C3w of the recording element 3w becomes positioned so as to be aligned with the track center Ct of the data recording track (i.e., the recording element 3w is made on-track to the data recording track).

On the other hand, when, as shown on the right in FIG. 5, the magnetic head 3 has moved into a control region including the point P2 described above due to the rotation of the magnetic disk 10 (i.e., when a control region including the point P2 has moved below the magnetic head 3), based on the servo control information Ds and the offset information Do stored in the storage unit 8, when writing data (a magnetic signal) onto a data recording track (a convex 21), the control unit 7 outputs, to the driver 6, a control signal S2 that adjusts the head position of the magnetic head 3 with an adjustment that has been calculated based on the distance Hb set as the offset (in this example, the adjustment is equal to the distance Hb) as the target value. By doing so, as shown in FIG. 5, the center C3w of the recording element 3w becomes positioned so as to be aligned with the track center Ct of the data recording track (i.e., the recording element 3w is made on-track to the data recording track).

In this way, by carrying out tracking servo control that uses the offset information Do in which an offset is set corresponding to each control region, the adjustment used to adjust the head position will be changed at least once (i.e., at least once not including the initial setting of the adjustment: in the present example, nineteen times) per revolution of the magnetic disk 10. This means that even if the skew angle continuously changes during one revolution of the magnetic disk 10 due to the pattern center Cp being displaced from the center of rotation Cr, it will be possible to maintain a state where the center C3w is aligned with the track center Ct of the data recording track (i.e., a state where the recording element 3w is made on-track to a data recording track) without the recording element 3w moving off a data recording track in any control region set along the direction of rotation of the magnetic disk 10.

Next, one embodiment of the offset information obtaining process carried out by the hard disk drive 1 will be described with reference to the drawings. Note that in the following description, for ease of understanding the present invention, an example will be described where the offset information Do used for tracking servo control is generated for sixty-four control regions 31a to 38h produced by dividing the magnetic disk 10 into eight in both the radial direction and the circumferential direction of the data track patterns 20t as shown in FIG. 6. On the magnetic disk 10 described above, a ring-shaped region in which the same patterns as the servo patterns 20s and the same patterns as the data track patterns 20t are formed is present both inside the innermost control regions 31a to 31h and outside the outermost control regions 38a to 38h. Although the patterns inside such ring-shaped regions are not used when recording or reproducing data on the magnetic disk 10, the following description assumes that sixteen regions 41a to 41h and 42a to 42h produced by dividing the respective ring-shaped regions into eight in the circumferential direction in the same way as the control regions 31a to 38h described above are present and the servo pattern regions As (the servo patterns 20s) and the data track pattern regions At (the data track patterns 20t) are also present in the regions 41a to 41h and 42a to 42h.

As one example, the hard disk drive 1 described above is constructed so that during an initialization process for the magnetic disk 10 and when a designating command that designates the offset measuring process has been outputted by an external apparatus (for example, the CPU of a personal computer), the control unit 7 carries out the offset information obtaining process for the present invention in accordance with the measuring process program Dp stored in the storage unit 8. Note that it is also possible to use a construction where the offset information is updated not only during initialization or when the designating command is outputted but also automatically by regularly carrying out the offset information obtaining process at intervals of a predetermined time set in advance.

During the offset information obtaining process, the control unit 7 first carries out a "standard offset obtaining process" for the present invention. More specifically, the control unit 7 first obtains a standard offset for each radial position on the magnetic disk 10 (i.e., offsets that are "standard offsets corresponding to same-rotational-radius positions" and "standard offsets corresponding to same-pattern-radius positions" for the present invention). When doing so, as one example, as shown in FIG. 6, the control unit 7 obtains eight standard offsets corresponding to eight radial positions that are the radial position of the point P31 in the control region 31*a*, the radial position of the point P32 in the control region 32*a*, the radial position of the point P33 in the control region 33*a*, the radial position of the point P34 in the control region 34*a*, the radial position of the point P35 in the control region 35*a*, the radial position of the point P36 in the control region 36*a*, the radial position of the point P37 in the control region 37*a*, and the radial position of the point P38 in the control region 38*a* (one example of positions at a "predetermined pitch" for the present invention).

Figure 8:
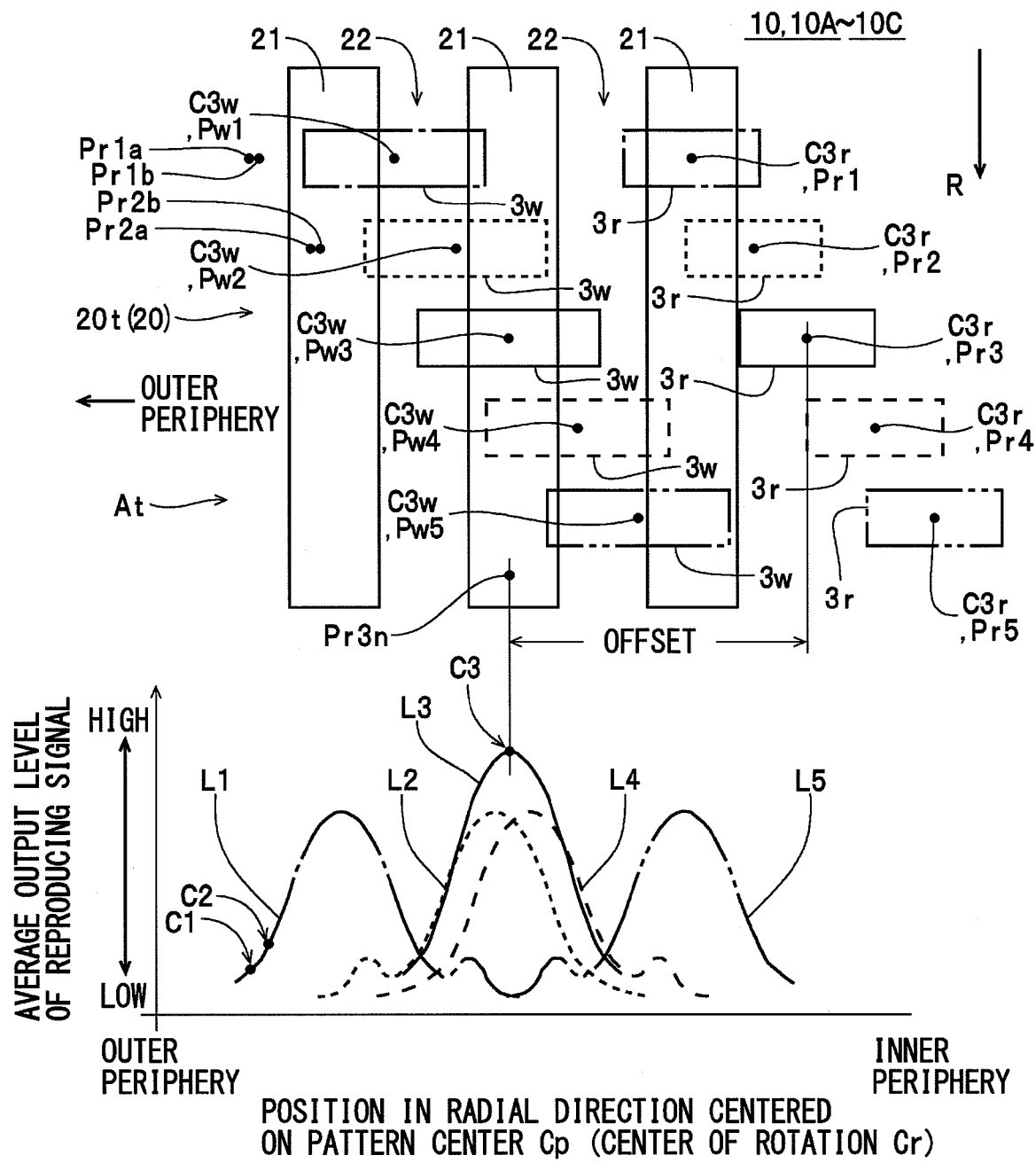
FIG. 8 is a plan view of a magnetic disk which is useful in explaining a method of obtaining an offset at each radial position.

More specifically, when obtaining the standard offset corresponding to the radial position of the point P31, for example, the control unit 7 first controls the motor 2 to have the magnetic disk 10 rotated and moves the magnetic head 3 so that as shown in FIG. 8, the center C3*r* of the reproducing element 3*r* passes the point Pr1 of the point P31 described above, for example. Next, the control unit 7 carries out tracking servo control over the magnetic head 3 to control the driver 6 so as to maintain the state where the center C3*r* of the reproducing element 3*r* passes the point Pr1 (i.e., so that the distance from the pattern center Cp is kept constant) and writes measurement signals using the recording element 3*w* onto the data track patterns 20*t* (the convexes 21 used as the data recording tracks) in the control regions 31*a* to 31*h* during one revolution of the magnetic disk 10.

When doing so, as described earlier, since the pattern center Cp is displaced from the center of rotation Cr of the magnetic disk 10, during tracking servo control of the magnetic head 3 that makes the center C3*r* of the reproducing element 3*r* pass the point Pr1, the swing arm 4*a* will swing (rotate). Accordingly, the distance (offset) along the radial direction between the center C3*r* of the reproducing element 3*r* and the center C3*w* of the recording element 3*w* will continuously change during one revolution of the magnetic disk 10. This means that the center C3*w* of the recording element 3*w* will pass in the vicinity of the point Pw1 inside the control region 31*a*, will pass further inside than the point Pw1 (to the right in FIG. 8) inside the control regions 31*b* to 31*d*, will pass in the vicinity of the point Pw1 inside the control region 31*e* in the same way as in the control region 31*a*, and will pass further outside than the point Pw1 (to the left in FIG. 8) inside the control regions 31*f* to 31*h*. As a result, the position in the radial direction at which the measurement signals are written onto the magnetic disk 10 will differ at each rotational position along the direction of rotation in accordance with the position passed by the recording element 3*w*.

Next, the control unit 7 carries out a process that reads the measurement signals written using the recording element 3*w*. More specifically, when the magnetic head 3 has moved so that the center C3*r* of the reproducing element 3*r* passes the point Pr1*a*, for example, further outside than the point Pr1 described above, the control unit 7 carries out tracking servo control over the magnetic head 3 to maintain the state where the center C3*r* passes the point Pr1*a* (i.e., where the distance from the pattern center Cp is kept constant) and reads measurement signals using the reproducing element 3*r* during one revolution of the magnetic disk 10. After this, the control unit 7 obtains an average value for the output value of the reproducing signal that has been read. Here, as one example, the output level (average value) shown by the arrow C1 in FIG. 8 is obtained.

Next, the control unit 7 carries out tracking servo control over the magnetic head 3 in a state where the magnetic head 3 has moved toward the inside by ¹⁄₂₀ of the track pitch of the servo tracks, for example, so that the center C3*r* of the reproducing element 3*r* passes the point Pr1*b*. In this state, the control unit 7 reads measurement signals using the reproducing element 3*r* during one revolution of the magnetic disk 10 and obtains an average value for the output level. Here, as one example, the output level (average value) shown by the arrow C2 in FIG. 8 is obtained. In this way, by moving the magnetic head 3 toward the inside by ¹⁄₂₀ of the track pitch and reading measurement signals during one revolution of the magnetic disk 10 every time the magnetic head 3 is moved to obtain an average value for the reproducing signal, average values for the output level in accordance with the position of the reproducing element 3*r* are obtained, as shown by the dot-dash line L1 in FIG. 8.

Next, after deleting the measurement signals written by the process described above, as shown in FIG. 8, the control unit 7 carries out tracking servo control over the magnetic head 3 in a state where the magnetic head 3 has moved so that as one example the center C3*r* of the reproducing element 3*r* passes a point Pr2*a* further inside than the point Pr1 by ¹⁄₁₀ of the track pitch of the servo tracks at the point P31 and writes measurement signals using the recording element 3*w* onto the data track patterns 20*t* (the convexes 21 used as the data recording tracks) in the control regions 31*a* to 31*h* during one revolution of the magnetic disk 10. Note that in FIG. 8, for ease of understanding the present invention, a state where the magnetic head 3 has moved by more than ¹⁄₁₀ of the track pitch of the servo tracks (i.e., a state where the distance between the points Pr1, Pr2 is greater than ¹⁄₁₀ of the track pitch of the servo tracks) is shown. Here, the center C3*w* of the recording element 3*w* passes in the vicinity of the point Pw2 inside the control region 31*a*, passes further inside than the point Pw2 (to the right in FIG. 8) inside the control regions 31*b* to 31*d*, passes in the vicinity of the point Pw2 inside the control region 31*e* in the same way as in the control region 31*a*, and passes further outside than the point Pw2 (to the left in FIG. 8) inside the control regions 31*f* to 31*h*. As a result, the position in the radial direction at which the measurement signals are written using the recording element 3*w* will differ at each rotational position along the direction of rotation of the magnetic disk 10 in accordance with the position passed by the recording element 3*w*.

Next, the control unit 7 carries out tracking servo control over the magnetic head 3 with the center C3*r* of the reproducing element 3*r* positioned so as to pass the point Pr2*a*, for example, further outside than the point Pr2, reads measurement signals using the reproducing element 3*r* during one revolution of the magnetic disk 10 and obtains an average value for the output level of the reproducing signal. The control unit 7 then repeats the process of moving the magnetic head 3 by ¹⁄₂₀ of the track pitch of the servo tracks toward the inside so that the center C3*r* passes the point Pr2*b*, carrying out tracking servo control over the magnetic head 3 while reading the measurement signals using the reproducing element 3r during one revolution of the magnetic disk 10, and obtaining an average value for the signal level of the reproducing signal. By doing so, average values for the output level are obtained in accordance with the position of the reproducing element 3r, as shown by the dotted line L2 in FIG. 8.

Next, the control unit 7 carries out tracking servo control over the magnetic head 3 with the center C3r of the reproducing element 3r positioned so as to pass a point Pr3 further inside than the point Pr2 by ¹/₁₀ of the track pitch at the point P31, writes the measurement signals using the recording element 3w, and then repeatedly carries out the process of reading the measurement signals in the state where the magnetic head 3 has moved to a predetermined position further outside than the point Pr3 and of obtaining an average value for the output level of the reproducing signal. By doing so, average values for the output level in accordance with the position of the reproducing element 3r are obtained, as shown by the solid line L3 in FIG. 8. In the same way, the control unit 7 carries out tracking servo control of the magnetic head 3 with the center C3r of the reproducing element 3r positioned so as to pass points Pr4, Pr5, writes the measurement signals using the recording element 3w, and repeatedly carries out the process of reading the measurement signals in the state where the magnetic head 3 has moved to a predetermined position further outside than the points Pr4, Pr5, and of obtaining average values for the output level of the reproducing signal. By doing so, average values for the output level in accordance with the position of the reproducing element 3r are obtained, as shown by the dashed line L4 and the dot-dot-dash line L5 in FIG. 8.

After this, the control unit 7 specifies the position (in this example, the point Pr3n) of the reproducing element 3r when a reproducing signal with the highest average output value (in this example, the output level shown by the arrow C3) is outputted from the magnetic head 3 during the reads of the measurement signals in the process described above and the position (in this example, the point P3r) of the reproducing element 3r during the writes of the measurement signals that were read to produce such reproducing signal. Note that when the pitch of the points Pr1, Pr2, . . . Pr5 in the example described above (in this example, ¹/₁₀ of the track pitch of the servo tracks) is small, there may be plural positions of the reproducing element 3r during the writes of the measurement signals with the highest average output value. In such case, an arbitrary position is specified out of the plural positions (as one example, a center position in the radial direction out of such positions). Next, the control unit 7 specifies a distance along the radial direction of the data track pattern 20t between the specified points Pr3n, Pr3 and stores the specified distance in the storage unit 8 as the standard offset (see FIG. 7) corresponding to that radial position (here, the radial position of the point P31).

Figure 7:
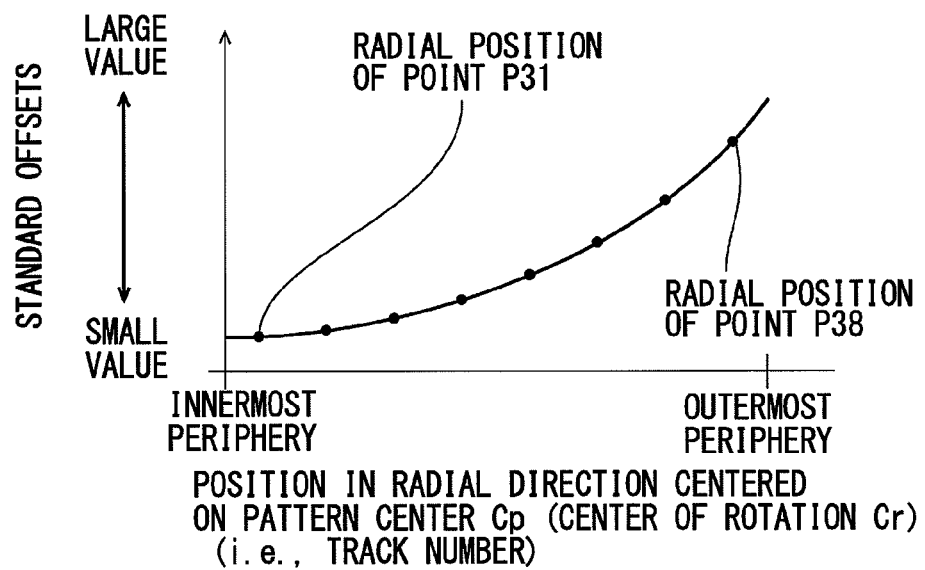
FIG. 7 is a diagram useful in explaining the relationship between the position of the magnetic head in the radial direction and the offset at each position.

After this, the control unit 7 carries out series of processes for seven radial positions that are the radial position of the point P32, the radial position of the point P33, the radial position of the point P34, the radial position of the point P35, the radial position of the point P36, the radial position of the point P37, and the radial position of the point P38 to obtain the respective standard offsets and stores the standard offsets in the storage unit 8, in the same way as the series of processes described above for the radial position of the point P31. By doing so, as shown in FIG. 7, standard offsets are obtained corresponding to each radial position on the magnetic disk 10. Here, when the control unit 7 stores a standard offset for each radial position in the storage unit 8, as one example, the standard offsets are stored in association with the track numbers of the sectors at the points P31 to P38. For radial positions aside from the sectors at the points P31 to P38, an interpolation process is carried out using the obtained standard offsets and the interpolated standard offsets are stored in the storage unit 8 in association with the track numbers of data recording tracks at the corresponding radial positions. In this way, the standard offset obtaining process for the present invention is completed. Here, in the offset information obtaining process, measurement signals are read during one revolution of the magnetic disk 10 during the standard offset obtaining process described above, an average value for the output level is obtained, and a standard offset is obtained. Accordingly, the same-pattern-radius positions corresponding to a predetermined standard offset and the same-rotational-radius positions corresponding to that standard offset will be effectively the same radial positions.

Note that although in the example described above, standard offsets are obtained for the radial positions of eight points (the points P31 to P38 in this example) in the radial direction of the magnetic disk 10 corresponding to the control regions 31a to 38h and standard offsets for the other radial positions are calculated by an interpolation process and stored in the storage unit 8, the method of obtaining the standard offsets is not limited to this. For example, it is also possible to use a construction where standard offsets are obtained at a predetermined pitch set in advance from the inner periphery to the outer periphery of the magnetic disk 10 regardless of the control regions 31a to 38h, with standard offsets for the other radial positions being calculated by an interpolation process using the obtained standard offsets. Also, although the standard offset for each radial position is stored in the storage unit 8 by storing the standard offset in association with the track numbers of the data recording tracks at the corresponding radial positions in the example described above, it is also possible to store the standard offsets in association with the track numbers of the servo tracks at the corresponding radial positions.

Next, the control unit 7 carries out a "separation distance obtaining process" for the present invention. More specifically, the control unit 7 controls the motor 2 to rotate the magnetic disk 10 and controls the driver 6 so that the swing arm 4a keeps pressing against a limiter (rotation restricting member) in a state where the magnetic head 3 is positioned at the inner periphery of the magnetic disk 10. When doing so, by maintaining a state where the swing arm 4a presses against the limiter, the magnetic head 3 becomes positioned at same-rotational-radius positions on the magnetic disk 10 (predetermined radial positions that are centered on the center of rotation Cr). Since the pattern center Cp of the data track patterns 20t and the like is displaced from the center of rotation Cr of the magnetic disk 10 (i.e., since the magnetic disk 10 is eccentrically attached to the motor 2), as shown by the dashed line in FIG. 6, by passing the same-rotational-radius positions, the center C3r of the reproducing element 3r will pass above plural sectors that are adjacent in the circumferential direction so as to cross plural servo tracks and plural data recording tracks (in this example, servo tracks and data recording tracks inside the regions 41a to 41h).

The control unit 7 successively reads track numbers and sector numbers from the address pattern regions Aa of the servo pattern regions As in the sectors passed by the magnetic head 3 and stores the read track numbers and sector numbers in the storage unit 8. Here, based on the read sector numbers, it is possible to specify the position in the direction of rotation of the magnetic disk 10 (i.e., the "rotational position" for the present invention) at which the magnetic head 3 (the reproducing element 3r) is located. Based on the read track number and the track number of a servo track (or a data recording track) used as a standard (as one example, the innermost servo track out of the servo tracks inside the control regions 31a to 31h), it is possible to specify the number of servo tracks present between the same-rotational-radius positions shown by the dashed line in FIG. 6 and the same-pattern-radius positions of the innermost servo track out of the servo tracks inside the control regions 31a to 31h (that is, the separation distance along the radial direction between the same-rotational-radius positions and the same-pattern-radius positions) at each rotational position.

Figure 9:
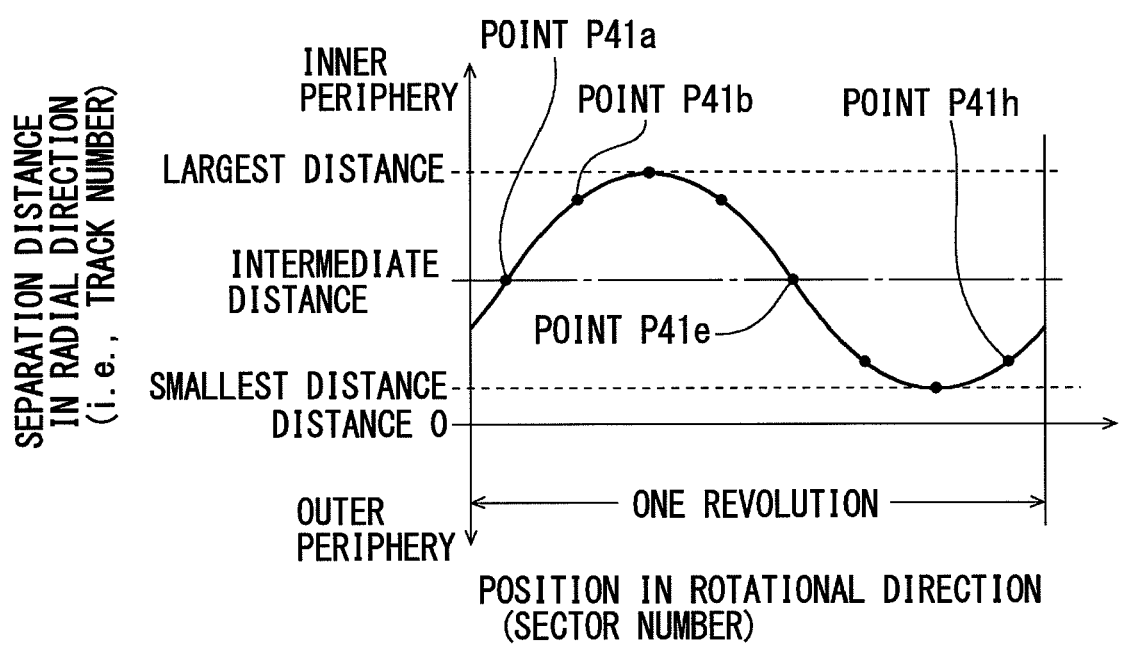
FIG. 9 is a diagram useful in explaining the separation distance (number of tracks) along a rotational radius between a predetermined same-pattern-radius position and a predetermined same-rotational-radius position at each rotational position.

Accordingly, the control unit 7 stores the numbers of servo tracks obtained as the separation distances in association with the sector numbers (one example of information relating to rotational positions) in the storage unit 8. By doing so, as shown in FIG. 9, information on the separation distances in accordance with the rotational positions (the points P41a, P41b, . . . P41h) at which the magnetic head 3 (the reproducing element 3r) is positioned is stored in the storage unit 8. Although the separation distances are obtained in a state where the swing arm 4a presses against the limiter (rotation restricting member) with the magnetic head 3 positioned in the inner periphery of the magnetic disk 10 in the example described above, it is also possible to obtain the separation distances in a state where the swing arm 4a presses against a limiter with the magnetic head 3 positioned in the outer periphery of the magnetic disk 10 (a state where the magnetic head 3 passes the positions shown by the dot-dash line in FIG. 6). Also, although the separation distance is obtained between the same-rotational-radius positions passed by the magnetic head 3 and the same-pattern-radius positions of the innermost servo track out of the servo tracks inside the control regions 31a to 31h in the example described above, for example, the difference between the separation distances at different rotational radius positions will be the same as in the example described above even when separation distances are obtained between same-rotational-radius positions passed by the magnetic head 3 and the pattern center Cp. By carrying out the process described above, the separation distance obtaining process for the present invention is completed.

After this, the control unit 7 carries out the "offset specifying process" for the present invention to specify the offset corresponding to each control region 31a to 38h. During this offset specifying process, the control unit 7 carries out a process that generates the offset information Do that can specify an offset for each control region 31a to 38h based on the standard offsets obtained by the standard offset obtaining process described above and the separation distances (information on a number of tracks for each rotational position) obtained by the separation distance obtaining process. More specifically, the control unit 7 first specifies rotational positions at which an intermediate separation distance between the largest separation distance and the smallest separation distance was obtained, based on the separation distances obtained by the separation distance obtaining process described above. When doing so, as one example, as shown in FIG. 9, the points P41a, P41e are specified.

Next, the control unit 7 calculates respective offsets for the control regions 31a to 38h. More specifically, for the control regions 31a to 38a, 31e to 38e that are present in the same direction (i.e., at the same rotational position) from the pattern center Cp as the points P41a, P41e described above, or in other words, regions where the distance from the pattern center Cp (i.e., the "pattern radius") is equal to the distance from the center of rotation Cr (i.e., the "rotational radius"), a value that was stored in the storage unit 8 as the standard offset corresponding to positions with the same pattern radius as the sector positioned in the center in both the radial direction and the direction of rotation of such control regions during the standard offset obtaining process (or in other words, a standard offset corresponding to a radial position where the same-pattern-radius positions and the same-rotational-radius positions are effectively the same due to the offset being obtained based on the average value for the output level of a reproducing signal during one revolution of the magnetic disk 10) is set as the offset corresponding to all of the sectors in that control region ("desired recording/reproducing positions" for the present invention). When doing so, as examples, a standard offset corresponding to a radial position of the point P31 positioned at the same pattern radius as the sector in the center is set as the offset corresponding to the control regions 31a, 31e, and a standard offset corresponding to a radial position of the point P38 positioned at the same pattern radius as the sector in the center is set as the offset corresponding to the control regions 38a, 38e.

Also, for control regions, like the control regions 31b to 38b, 31c to 38c, 31d to 38d, that are present in the same direction (i.e., at the same rotational positions) as the points P41b to P41d where separation distances (i.e., numbers of tracks) that are longer than at the points P41a, P41e described above were obtained in the separation distance obtaining process, or in other words, control regions where the distance from the pattern center Cp (i.e., the "pattern radius") differs to the distance from the center of rotation Cr (i.e., the "rotational radius") such that the pattern radius<rotational radius, a standard offset associated with the track number of a data recording track positioned further outside than the data recording track in the center of such control regions by a number of tracks produced by subtracting the number of data recording tracks corresponding to the number of servo tracks obtained as the separation distance of the points P41a, P41e described above from the number of tracks obtained as the respective separation distances is set as the offset corresponding to all of the sectors ("desired recording/reproducing positions" for the present invention) in such control regions. In this example, such standard offset will have been calculated by the interpolation process during the standard offset obtaining process.

Also, for control regions, like the control regions 31f to 38f, 31g to 38g, 31h to 38h, that are present in the same direction (i.e., at the same rotational position) as the points P41f to P41h where separation distances (i.e., numbers of tracks) that are shorter than at the points P41a, P41e described above were obtained in the separation distance obtaining process, or in other words, control regions where the distance from the pattern center Cp (i.e., the "pattern radius") differs to the distance from the center of rotation Cr (i.e., the "rotational radius") such that the pattern radius>rotational radius, a standard offset associated with the track number of a data recording track positioned further inside than the data recording track in the center of such control regions by a number of tracks produced by subtracting the number of data recording tracks corresponding to the number of servo tracks obtained as the separation distance of the points P41a, P41e described above from the number of tracks obtained as the respective separation distances is set as the offset corresponding to all of the sectors ("desired recording/reproducing positions" for the present invention) in such control regions.

In this way, based on the standard offset for each radial position (i.e., each data recording track) obtained by the standard offset obtaining process and the separation distance (i.e., number of tracks) for each rotational position (each sector) obtained by the separation distance obtaining process, corresponding offsets are set for the sixty-four control regions 31a to 38h and the offset information Do that can specify such offsets is generated by the control unit 7 and stored in the storage unit 8. When the control unit 7 stores the generated offset information Do in the storage unit 8, the offset information obtaining process is completed. By using the offset information Do stored in the storage unit 8, tracking servo control is carried out as described earlier.

Next, another embodiment of an offset information obtaining process carried out by the hard disk drive 1 will be described with reference to the drawings. Note that description of parts of this offset information obtaining process that are the same as in the offset information obtaining process described above is omitted.

First, the control unit 7 carries out the separation distance obtaining process for the present invention. Note that since this separation distance obtaining process has the same procedure as the separation distance obtaining process described above, description thereof is omitted. Next, the control unit 7 carries out the standard offset obtaining process for the present invention. Although during the standard offset obtaining process for the present invention in the offset information obtaining process described above, the control unit 7 writes the measurement signals during one revolution of the magnetic disk 10 and calculates the standard offset for each radial position based on an average value during one revolution for a reproducing signal for the written measurement signals, during the standard offset obtaining process in this offset information obtaining process, measurement signals are written onto an arbitrary part of the magnetic disk 10 and the standard offset for each radial position is calculated based on the reproducing signal for the written measurement signals.

More specifically, the control unit 7 first specifies a region where measurement signals are to be written and read during the standard offset obtaining process based on the separation distance for each rotational position on the magnetic disk 10 obtained by the separation distance obtaining process described above. When doing so, rotational positions at which an intermediate separation distance between the largest separation distance and the smallest separation distance was obtained, that is, rotational positions (in this example, the rotational positions of the points P41a, P41e) where the distance from the pattern center Cp (i.e., the pattern radius) and the distance from the center of rotation Cr (i.e., the rotational radius) are equal is specified. Next, the control unit 7 decides to write the measurement signals inside the control regions (the control regions 31a to 38a) positioned in the same direction from the pattern center Cp as one out of the two specified rotational positions (as one example, the rotational position of point P41a). When doing so, as one example, the control unit 7 decides to obtain eight standard offsets corresponding to eight radial positions (one example of a "predetermined pitch" for the present invention: see FIG. 6) that are the radial position of the point P31 in the control region 31a, the radial position of the point P32 in the control region 32a, the radial position of the point P33 in the control region 33a, the radial position of the point P34 in the control region 34a, the radial position of the point P35 in the control region 35a, the radial position of the point P36 in the control region 36a, the radial position of the point P37 in the control region 37a, and the radial position of the point P38 in the control region 38a.

When doing so, as the standard offset of the radial position of the point P31, for example, the control unit 7 repeatedly carries out writes of measurement signals and reads of the written measurement signals on the data track pattern region At (data recording tracks) of sectors positioned at the position of the point P31 in the control region 31a plural times to obtain an offset, and as the standard offset of the radial position of the point P32, for example, the control unit 7 repeatedly carries out writes of measurement signals and reads of the written measurement signals on a data track pattern region At (data recording tracks) of sectors positioned at the position of the point P32 in the control region 32a plural times to obtain an offset. Similarly, as the standard offsets of the radial positions of the points P33 to P38, in the same way as when obtaining the offsets for the radial positions of the points P31, P32, the control unit 7 repeatedly carries out writes of measurement signals and reads of the written measurement signals on a data track pattern region At (data recording tracks) of sectors positioned at the positions of the points P33 to P38 in the control regions 33a to 38a plural times to obtain the respective offsets.

Figure 10:
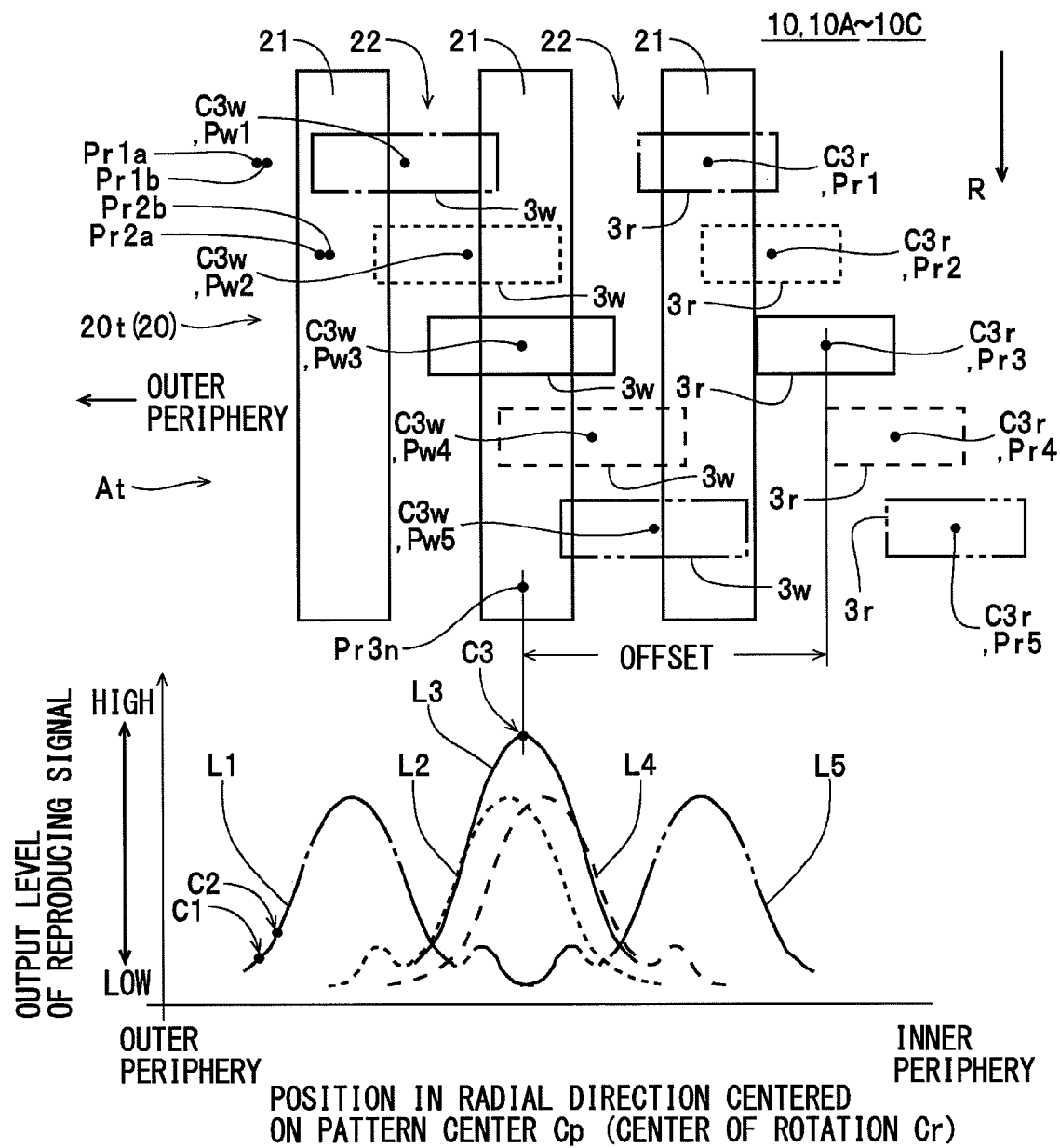
FIG. 10 is a plan view of a magnetic disk which is useful in explaining another method of obtaining an offset at each radial position.

More specifically, the control unit 7 controls the motor 2 to rotate the magnetic disk 10 and, as shown in FIG. 10, while carrying out tracking servo control over the magnetic head 3 in a state where the magnetic head 3 is positioned so that the center C3r of the reproducing element 3r passes the point Pr1 at the point P31 described above, writes the measurement signals onto the data recording track using the recording element 3w. When doing so, the center C3w of the recording element 3w will be positioned so as to pass the point Pw1. Next, while carrying out tracking servo control over the magnetic head 3 in a state where the magnetic head 3 has moved so that the center C3r passes a point Pr1a, for example, that is further outside than the point Pr1, the control unit 7 reads the measurement signals using the reproducing element 3r and obtains the output level of the reproducing signal. When doing so, since part of the reproducing element 3r in the read width direction coincides with the recording region of the measurement signals, the reproducing signal is outputted from the magnetic head 3 at the output level shown by the arrow C1 in FIG. 10.

After this, the control unit 7 moves the magnetic head 3 by $\frac{1}{20}$ of the track pitch of the servo tracks toward the inside and reads the measurement signals using the reproducing element 3r in a state where the magnetic head 3 has moved so that the center C3r of the reproducing element 3r passes the point Pr1b at the point P31. When doing so, since a larger part of the reproducing element 3r in the read width direction will coincide with the recording region of the measurement signals, the reproducing signal is outputted from the magnetic head 3 at the output level shown by the arrow C2 in FIG. 10. In this way, by moving the magnetic head 3 toward the inside by $\frac{1}{20}$ of the track pitch and reading the measurement signals each time, a reproducing signal is outputted from the magnetic head 3 at the output level shown by the dot-dash line L1 in accordance with the position of the reproducing element 3r.

After this, the control unit 7 deletes the measurement signals written by the process described above and then, while carrying out tracking servo control over the magnetic head 3 in a state where the magnetic head 3 has moved so that the center C3r of the reproducing element 3r, for example, passes a point Pr2 inside the point Pr1 by $\frac{1}{10}$ of the track pitch of the servo tracks at the point P31, writes the measurement signals onto data recording tracks via the recording element 3w. Note that in FIG. 10, for ease of understanding the present invention, a state where the magnetic head 3 has moved by more than $\frac{1}{10}$ of the track pitch of the servo tracks is shown (a state where the distance between the points Pr1, Pr2 is greater than $\frac{1}{10}$ of the track pitch of the servo tracks).

When doing so, the recording element 3w is positioned so that the center C3w of the recording element 3w passes the point Pw2. Next, while carrying out tracking servo control over the magnetic head 3 in a state where the magnetic head 3 has been moved so that the center C3r of the reproducing element 3r passes a point Pr2a, for example, that is further outside than the point Pr2, the control unit 7 reads the measurement signals using the reproducing element 3r to obtain the output level of the reproducing signal. The control unit 7 thereafter repeatedly carries out the process that moves the magnetic head 3 toward the inside by 1/20 of the track pitch of the servo tracks, carries out tracking servo control over the magnetic head 3 in a state where the magnetic head 3 has moved so that the center C3r of the reproducing element 3r passes the point Pr2b and reads the measurement signals using the reproducing element 3r. By doing so, the measurement signals are read at the output level shown by the dashed line L2 in FIG. 10 in accordance with the position of the reproducing element 3r.

Next, while carrying out tracking servo control over the magnetic head 3 at a position where the center C3r of the reproducing element 3r passes a point Pr3, which is further inside than the point Pr2 by 1/10 of the track pitch of the servo tracks, at the point P31 (i.e., a position of the magnetic head 3 where the center C3w of the recording element 3w passes the point Pw3), the control unit 7 writes the measurement signals and also starts a process that reads the measurement signals in a state where the magnetic head 3 has moved to a predetermined position to the outside. After this, the control unit 7 repeatedly carries out a process that reads the measurement signals using the reproducing element 3r in a state where the magnetic head 3 has moved toward the inside by 1/20 of the track pitch. By doing so, a reproducing signal is outputted from the magnetic head 3 at the output level shown by the solid line L3 in FIG. 10 in accordance with the position of the reproducing element 3r.

In the same way, the control unit 7 writes the measurement signals in a state where the center C3r of the reproducing element 3r passes the points Pr4, Pr5 at the point P31 (a state where the center C3w of the recording element 3w passes the points Pw4, Pw5) and starts a process that reads the measurement signals in a state where the magnetic head 3 has moved to a predetermined position to the outside and then repeatedly carries out the process that reads the measurement signals using the reproducing element 3r in a state where the magnetic head 3 has moved toward the inside by 1/20 of the track pitch. By doing so, reproducing signals are outputted from the magnetic head 3 at the output levels shown by the dashed line L4 and the dot-dot-dash line L5 in FIG. 10 in accordance with the position of the reproducing element 3r.

After this, the control unit 7 specifies the position (in this example, the point Pr3n) of the reproducing element 3r when the reproducing signal with the highest output level (in this example, the output level shown by the arrow C3) was outputted from the magnetic head 3 during the reads of the measurement signals in the process described above and the position (in this example, the point P3r) of the reproducing element 3r during the writes of the measurement signals that were read to produce such reproducing signal. Note that when the pitch of the points Pr1, Pr2, . . . Pr5 in the example described above (in this example, 1/10 of the track pitch of the servo tracks) is small, there may be plural positions of the reproducing element 3r during the writes of the measurement signals with the highest output level. In such case, an arbitrary position is specified out of the plural positions (as one example, a central position in the radial direction out of such positions). Next, the control unit 7 specifies a distance along the radial direction of the data track pattern 20t between the specified points Pr3n, Pr3 and stores the specified distance in the storage unit 8 as the offset corresponding to the sector (in this example, a sector in the center of the control region 31a), that is, the standard offset (see FIG. 7) of the radial position of the point P31.

After this, the control unit 7 obtains seven standard offsets corresponding to seven radial positions that are the radial position of the point P32, the radial position of the point P33, the radial position of the point P34, the radial position of the point P35, the radial position of the point P36, the radial position of the point P37, and the radial position of the point P38 according to the same procedure as when the standard offset at the radial position of the point P31 described above was obtained and stores the corresponding standard offsets in the storage unit 8. By doing so, as shown in FIG. 7, the standard offsets corresponding to the same-pattern-radius positions on the magnetic disk 10 are obtained. Here, when the control unit 7 stores a standard offset for each radial position in the storage unit 8, as one example, the standard offsets are stored in association with the track numbers of the data recording tracks at the radial positions of the sectors where the writes and reads of the measurement signals described above were carried out (i.e., the sectors at which the offsets were measured).

For radial positions aside from the radial positions of the sectors at which the offsets were measured, standard offsets are calculated by an interpolation process that uses the measured offsets and stored in the storage unit 8 in association with the track numbers of the data recording tracks at the corresponding radial positions. Also, although the standard offset for each radial position is stored in the storage unit 8 by storing the standard offset in association with the track numbers of the data recording tracks at the corresponding radial positions in the example described above, it is also possible to store the standard offsets in association with the track numbers of the servo tracks at the corresponding radial positions. By doing so, the standard offset obtaining process according to the present invention is completed. Note that although standard offsets of radial positions of the points P31 to P38 are measured corresponding to the control regions 31a to 38h and stored in the storage unit 8 in the example described above, it is also possible to use a method where the standard offsets shown in FIG. 7 are obtained by measuring offsets at a predetermined pitch set in advance from the inner periphery to the outer periphery of the magnetic disk 10 regardless of the control regions 31a to 38a and calculating offsets by an interpolation process for the other radial positions.

After this, the control unit 7 carries out the "offset specifying process" for the present invention to specify the offset corresponding to each control region 31a to 38h. During this offset specifying process, the control unit 7 carries out a process that generates the offset information Do that can specify an offset for each control region 31a to 38h based on the standard offsets obtained by the standard offset obtaining process described above and the separation distances (information on a number of tracks for each rotational position) obtained by the separation distance obtaining process.

More specifically, for the control regions 31a to 38a, 31e to 38e that are present in the same direction (i.e., at the same rotational position) from the pattern center Cp as the positions specified as the rotational positions (in this example, the points P41a, P41e) where an intermediate separation distance between the largest separation distance and the smallest separation distance was obtained, or in other words, regions positioned in the same direction from the pattern center Cp as the regions in which measurement signals were written during the standard offset obtaining process and regions that are opposite such regions on the other side of the pattern center Cp: regions where the pattern radius and the rotational radius are equal), the standard offset corresponding to positions with the same pattern radius as the sector positioned in the center in both the radial direction and the direction of rotation of such control regions during the standard offset obtaining process is set as the offset corresponding to such control regions. When doing so, as one example, a standard offset corresponding to the radial position of the point P31 positioned at the same pattern radius as the sector in the center is set as the offset corresponding to the control regions 31a, 31e and a standard offset corresponding to the radial position of the point P38 positioned at the same pattern radius as the sector of the center is set as the offset corresponding to the control regions 38a, 38e.

Also, for control regions, like the control regions 31b to 38b, 31c to 38c, 31d to 38d, that are present in the same direction (i.e., at the same rotational position) as the points P41b to P41d where separation distances (i.e., numbers of tracks) that are longer than at the points P41a, P41e described above were obtained in the separation distance obtaining process, a standard offset associated with the track number of a data recording track positioned further outside than the data recording track in the center of such control regions by a number of tracks produced by subtracting the number of data recording tracks corresponding to the number of servo tracks obtained as the separation distance of the points P41a, P41e described above from the number of tracks obtained as the respective separation distances is set as the offset corresponding to all of the sectors ("desired recording/reproducing positions" for the present invention) in such control regions. In this example, such standard offset will have been calculated by the interpolation process during the standard offset obtaining process.

Also, for control regions, like the control regions 31f to 38f, 31g to 38g, 31h to 38h, that are present in the same direction (i.e., at the same rotational position) as the points P41f to P41h where separation distances (i.e., numbers of tracks) that are shorter than at the points P41a, P41e described above were obtained, a standard offset associated with the track number of a data recording track positioned further inside than the data recording track in the center of the control regions by a number of tracks produced by subtracting the number of data recording tracks corresponding to the number of servo tracks obtained as the separation distance of the points P41a, P41e described above from the number of tracks obtained as the respective separation distances is set as the offset corresponding to all of the sectors ("desired recording/ reproducing positions" for the present invention) in such control regions. In this example, such standard offset will have been calculated by the interpolation process during the standard offset obtaining process.

In this way, based on the standard offset for each same-pattern-radius position obtained by the standard offset obtaining process (in this example, a standard offset for each data recording track and a standard offset for each same-rotational-radius position) and the separation distance (i.e., number of tracks) for each rotational position (each sector) obtained by the separation distance obtaining process, corresponding offsets are set for the sixty-four control regions 31a to 38h and the offset information Do that can specify such offsets is generated by the control unit 7 and stored in the storage unit 8. When the control unit 7 stores the generated offset information Do in the storage unit 8, the offset information obtaining process is completed. By using the offset information Do stored in the storage unit 8, tracking servo control is carried out as described earlier.

In this way, according to the hard disk drive 1 and the tracking servo control method carried out by the control unit 7, during tracking servo control on one of the reproducing element 3r and the recording element 3w of the composite magnetic head 3 (in this example, the recording element 3w), the control unit 7 adjusts the head position of the magnetic head 3 while changing the adjustment in accordance with the offset specified based on the offset information Do stored in the storage unit 8 at least once per revolution of the magnetic disk 10. By doing so, according to the hard disk drive 1 and this tracking servo control method, unlike the conventional recording/reproducing apparatus where tracking servo control is carried out using a single adjustment (offset) per data recording track, by adjusting the head position of the magnetic head 3 with an adjustment calculated based on an offset corresponding to each recording/reproducing position along the circumferential direction of the data track patterns 20t as a target value, it is possible to reliably make the recording element 3w on-track to a data recording track around an entire revolution of the magnetic disk 10.

Accordingly, it is possible to avoid a situation where the write width of a magnetic signal on a data recording track becomes insufficient (i.e., where a recording error occurs) and to therefore write a magnetic signal onto a data recording track with a sufficient write width. As a result, during the reproducing of the magnetic signal, a reproducing signal with a sufficiently high output level can be obtained. By doing so, it is possible to avoid reproducing errors and to properly reproduce the data. It is also possible to avoid the side writing phenomenon and to reliably record data on only the desired data recording track.

In addition, according to the hard disk drive 1, when carrying out tracking servo control to keep one element out of the reproducing element 3r and the recording element 3w (in this example, the recording element 3w) on a data recording track included in a predetermined control region, the control unit 7 adjusts the head position of the magnetic head 3 with an adjustment calculated based on an offset set corresponding to such control region as a target value. By doing so, according to the hard disk drive 1, unlike for example a construction where the adjustment of the head position of the magnetic head 3 is continuously changed in infinite steps in accordance with rotation of the swing arm 4a at each rotational position on the magnetic disk 10, the respective adjustments for the control regions 31a to 38h can be easily calculated based on offsets provided separately for the control regions 31a to 38h. As a result, it is possible to carry out tracking servo control at a sufficiently high speed corresponding to the degree to which tracking servo control by the control unit 7 is simplified. Accordingly, even when the magnetic disk 10 is rotated at high speed, the magnetic head 3 (the recording element 3w) can be reliably made on-track to a desired data recording track.

In addition, in the hard disk drive 1, as one example, the control unit 7 carries out one of the two offset information obtaining processes described below to generate the offset information Do. More specifically, according to a first processing method, the control unit 7 carries out a standard offset obtaining process that obtains standard offsets corresponding to same-rotational-radius positions at a predetermined pitch on the magnetic disk 10 (in this example, radial positions that correspond to both same-rotational-radius positions and same-pattern-radius positions), a separation distance obtaining process that obtains, corresponding to rotational positions at a predetermined pitch along the direction of rotation of the magnetic disk 10, separation distances along the rotational radius direction of the magnetic disk 10 between a predetermined same-pattern-radius position on the magnetic disk 10 and a predetermined position out of the same-rotational-radius positions, and an offset specifying process that specifies an offset corresponding to sectors ("desired recording/reproducing positions" for the present invention) in each control region on the magnetic disk 10 based on the standard offset corresponding to each same-rotational-radius position and the separation distance corresponding to each rotational position, with the control unit 7 generating the offset information Do based on the specified offsets.

According to a second processing method, the control unit 7 carries out a standard offset obtaining process that obtains standard offsets corresponding to the same-pattern-radius positions on the magnetic disk 10 at a predetermined pitch, a separation distance obtaining process that obtains, corresponding to each rotational position along the direction of rotation of the magnetic disk 10 at a predetermined pitch, separation distances along the radial direction of the data track patterns 20*t* between a predetermined same-rotational-radius position on the magnetic disk 10 and a predetermined position out of the same-pattern-radius positions, and an offset specifying process that specifies an offset corresponding to sectors ("desired recording/reproducing positions" for the present invention) in a control region on the magnetic disk 10 based on the standard offset corresponding to each same-pattern-radius position and the separation distance corresponding to each rotational position, with the control unit 7 generating the offset information Do based on the specified offsets.

By doing so, according to the hard disk drive 1, when the number of control regions per magnetic disk 10 is high, for example, compared to a recording/reproducing apparatus constructed so as to generate the offset information Do by separately measuring an offset in each control region, it is possible to sufficiently reduce the time required to generate the offset information Do.

Also, in the hard disk drive 1, during the standard offset obtaining process described above, the control unit 7 obtains a "standard offset" for the present invention in association with the track number at each radial position. During the separation distance obtaining process, the control unit 7 reads a sector number and track number from each sector at same-rotational-radius positions and obtains, as the "separation distances" for the present invention, a number of tracks between each sector and a standard track based on the track number of the standard track and the track numbers of such sectors, with each sector at predetermined same-rotational-radius positions as the rotational positions on the magnetic disk 10. During the offset specifying process, the control unit 7 specifies, as the offset of a desired recording/reproducing position (in this example, a desired sector in the control region described above), a standard offset associated with the track number of a data recording track separated from the desired recording/reproducing position by a number of data recording tracks corresponding to the number of servo tracks obtained as the separation distance of a sector positioned in the same direction as the predetermined recording/reproducing position. In this way, according to the hard disk drive 1, during the separation distance obtaining process, unlike a construction that measures actual distances on the magnetic disk 10 for example, it is possible to measure the separation distances using a mechanism provided in a typical hard disk drive. This means that there is no need to provide a dedicated mechanism to measure the actual distances and it is therefore possible to reduce the manufacturing cost of the hard disk drive 1.

Note that the present invention is not limited to the construction and method described above. For example, although a hard disk drive 1 constructed to carry out tracking servo control using offset information Do that can specify an offset corresponding to each control region produced by dividing the magnetic disk 10 in both the radial direction and the circumferential direction of the data track patterns 20*t* has been described, the construction of the recording/reproducing apparatus according to the present invention is not limited to this. More specifically, as one example, when tracking is carried out to keep one element out of the reproducing element 3*r* and the recording element 3*w* on a data recording track included in a predetermined region out of the control regions where a corresponding offset is stored in the storage unit 8 as the offset information Do, an offset set corresponding to such control region may be specified based on the offset information Do and the head position of the magnetic head 3 may be adjusted using an adjustment calculated based on the specified offset as the target value. When tracking is carried out to keep the element described above on the data recording track included in a predetermined region out of the control regions aside from the control regions for which a corresponding offset is stored in the storage unit 8, the offset corresponding to the control region may be calculated by an interpolation process that uses the offset information Do stored in the storage unit 8 and the head position of the magnetic head 3 may be adjusted using an adjustment calculated based on the calculated offset as the target value.

According to a hard disk drive that uses the construction described above, a smaller number of offsets are stored in the storage unit 8 (that is, the data size of the offset information Do is reduced), and therefore it is possible to construct the storage unit 8 of a storage element with a corresponding reduction in storage capacity. Accordingly, it is possible to sufficiently reduce the manufacturing cost of the hard disk drive.

Also, although two examples of processing methods have been described as the processing method that generates the offset information Do that can specify the respective offsets corresponding to the control regions 31*a* to 38*h* based on the standard offsets corresponding to each radial position obtained by the standard offset obtaining process and the separation distances corresponding to each rotational position obtained by the separation distance obtaining process, the offset information obtaining process according to the present invention is not limited to such methods. For example, it is possible to generate the offset information Do by measuring an offset separately for each of the control regions 31*a* to 38*h*. According to a hard disk drive constructed so as to generate the offset information Do using this method, it is possible to construct the offset information Do using correct offsets for the actual drive that have been obtained by actual measurement. Accordingly, during tracking servo control, since it is possible to correctly adjust the head position in the control regions 31*a* to 38*h* by calculating appropriate adjustments for the actual drive, it is possible to reliably avoid recording errors, reproducing errors, side writing phenomena, and side reading phenomena.

In addition, it is possible to measure some of the offsets out of the offsets corresponding to the control regions 31*a* to 38*h* separately for selected control regions, to calculate the other offsets by an interpolation process that uses the offsets measured for such control regions, and to generate the offset information Do based on the measured offsets and the calculated offsets. According to a hard disk drive constructed so as to generate the offset information Do using this method, compared to a hard disk drive constructed to measure offsets for all of the control regions 31*a* to 38*h*, it is possible to reduce the time required to generate the offset information Do in keeping with the reduction in the number of measurements of offsets per magnetic disk.

Although a method of measuring standard offsets using convexes 21 (data recording tracks: recording regions) formed in the data track pattern regions At has been described, the present invention is not limited to this and it is also possible to use a method that measures the standard offsets (or offsets corresponding to control regions) using any of the convexes 21 in the servo pattern regions As and/or convexes 21 (not shown) inside offset measuring regions provided separately to the data track pattern regions At and the servo pattern regions As.

In addition, although a construction has been described where the head position is adjusted with a region where ten sectors that are consecutive in the direction of rotation are grouped together for fifty tracks as a control region for the present invention, the number of sectors that constructs a control region for the present invention is not limited to this, and a region where an arbitrary number of sectors that are consecutive in the direction of rotation are grouped together for an arbitrary number of tracks may be set as a control region for the present invention. The numbers of sectors in the radial direction and the circumferential direction that construct one control region are not limited to plural numbers, and it is possible to set plural control regions on the magnetic disk 10 with the number of sectors in the radial direction that construct one control region at one and the number of sectors in the circumferential direction at two or more. In addition, it is possible to set plural control regions on the magnetic disk 10 with the number of sectors in the circumferential direction that construct one control region at one and the number of sectors in the radial direction at two or more. It is also possible to set one sector on the magnetic disk 10 as a control region. In this way, the number of sectors included in one control region can be set at a number within a range where accurate tracking is possible when the head position is adjusted based on one offset, for example.

Figure 11:
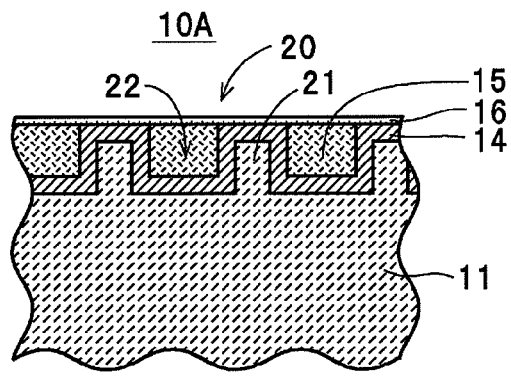
FIG. 11 is a cross-sectional view of another magnetic disk.
Figure 1:
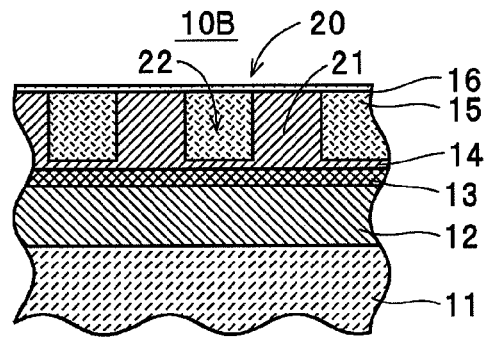
Figure 1:
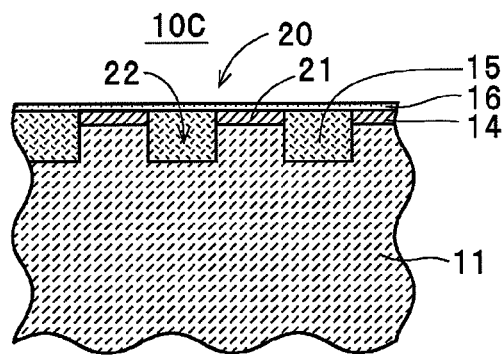
Figure 1:
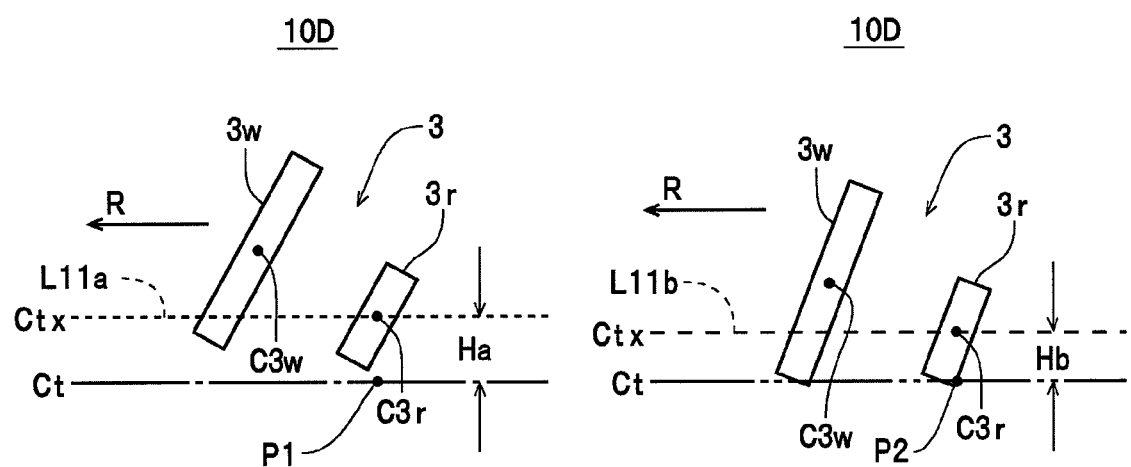

Also, although an example of the magnetic disk 10 where the entire region from the protruding end parts to the base end parts of the convexes 21 in the concave/convex pattern 20 (the data track patterns 20*t* and the servo patterns 20*s*) is formed of the magnetic layer 14 (magnetic material) has been described, the construction of the magnetic recording medium according to the present invention is not limited to this. More specifically, as one example, like a magnetic disk 10A shown in FIG. 11, by forming a thin magnetic layer 14 so as to cover a concave/convex pattern formed in the glass substrate 11 (a concave/convex pattern where the concaves and convexes have the same positional relationship as the concave/convex pattern 20), it is possible to construct the concave/convex pattern 20 (the data track patterns 20*t* and the servo patterns 20*s*) from plural convexes 21 whose surfaces are formed of magnetic material and plural concaves 22 whose base surfaces are formed of the magnetic material. Also, like a magnetic disk 10B shown in FIG. 12, it is possible to construct a concave/convex pattern 20 where not only the convexes 21 but also the base parts of the concaves 22 are formed of the magnetic layer 14. As another example, like a magnetic disk 10C shown in FIG. 13, it is also possible to construct the concave/convex pattern 20 so as to include plural convexes 21 where only the protruding end parts of the convexes are formed of the magnetic layer 14 and the base end parts of the convexes are formed of a non-magnetic material or a soft magnetic material (in this example, the glass substrate 11). In this case, a thin magnetic layer 14 may be formed on the base surfaces of the concaves 22 on the magnetic disk 10C.

In addition, it is also possible to construct a magnetic disk (not shown) by filling concaves formed in a layer of non-magnetic material with the magnetic material that constructs the magnetic layer 14 described above and setting the positions of the convexes in the layer of non-magnetic material as the non-recording regions (i.e., regions corresponding to the concaves 22 of the magnetic disk 10 and the like) and positions of the magnetic material filled inside the concaves as the recording regions (i.e., regions corresponding to the convexes 21 of the magnetic disk 10 and the like). It is also possible to construct a magnetic disk (not shown) by selectively modifying desired regions in a layer of magnetic material to form regions whose ability to store a magnetic signal in a readable manner is lower than the periphery thereof or regions that effectively cannot store a magnetic signal, setting regions whose ability to store a magnetic signal in a readable manner is high as the recording regions (i.e., regions corresponding to the convexes 21 of the magnetic disk 10 and the like), and setting regions whose ability to store a magnetic signal in a readable manner is low as non-recording regions (i.e., regions corresponding to the concaves 22 of the magnetic disk 10 and the like).

In addition, although examples have been described where the data track patterns 20*t* and the servo patterns 20*s* in the convex/concave pattern 20 both have convexes 21 and concaves 22, the magnetic recording medium according to the present invention is not limited to such and it is possible to achieve a construction that is capable of recording and reproducing data by forming the servo patterns 20*s* of the concave/convex pattern 20 inside the servo pattern regions As and forming a continuous magnetic film (a smooth magnetic layer 14 with no concaves or convexes) inside the data track pattern regions At. It is also possible to apply the recording/reproducing apparatus according to the present invention to a hard disk drive equipped with a continuous recording film-type magnetic disk where both the servo pattern regions As and the data track pattern regions At are constructed of a continuous magnetic film, servo patterns are written by magnetic patterns inside the servo pattern regions As, and data recording tracks are formed at positions passed by the recording element 3*w* during the recording of data.

Figure 18:
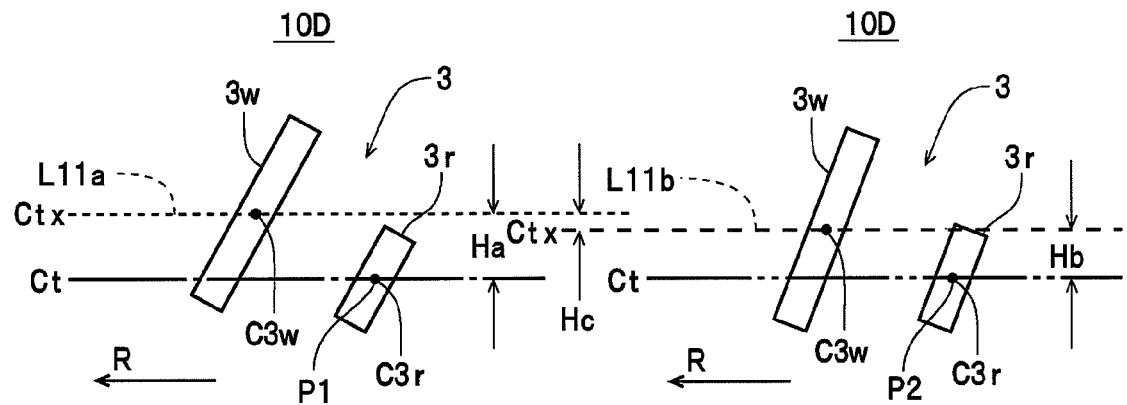
FIG. 18 is composed of two plan views, with the left plan view showing the magnetic head and the magnetic disk in a state where the reproducing element of the magnetic head has been positioned on the track center of a virtual data recording track in a predetermined sector and the right plan view showing the magnetic head and the magnetic disk in a state where the reproducing element has been positioned on the track center of a virtual data recording track in another predetermined sector.
Figure 19:
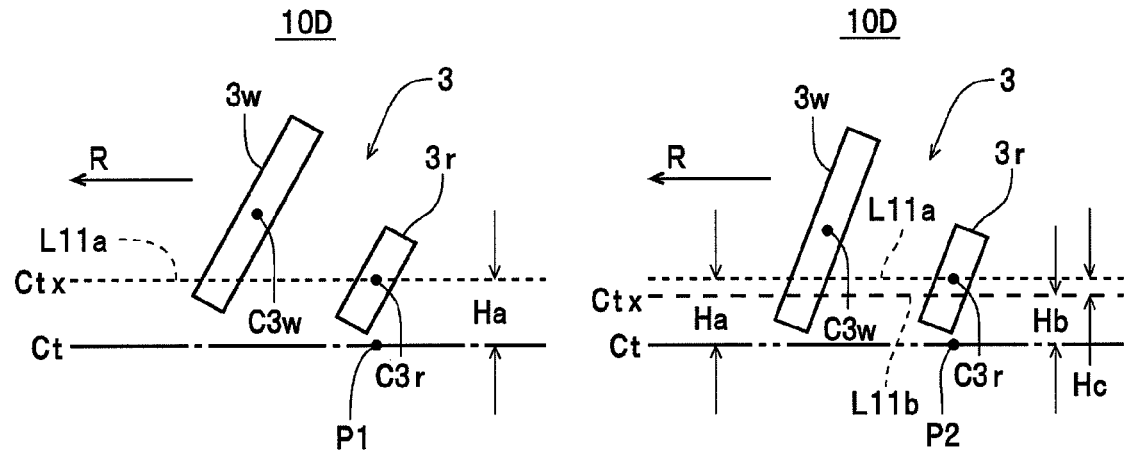
FIG. 19 is composed of two plan views, with the left plan view showing the magnetic head and the magnetic disk in a state where the head position has been adjusted with an adjustment calculated based on a distance as a target value when carrying out tracking so that the reproducing element of the magnetic head is positioned on the track center of an actual data recording track in a predetermined sector and the right plan view showing the magnetic head and the magnetic disk in a state where the head position has been adjusted with an adjustment calculated based on a distance as a target value when carrying out tracking so that the reproducing element is positioned on the track center of an actual data recording track in another predetermined sector.

In a hard disk drive equipped with a continuous recording film-type magnetic disk, as shown on the left in FIG. 18, as one example, when a magnetic signal has been written using the recording element 3*w* in a state where the reproducing element 3*r* is positioned at the track center Ct of a virtual data recording track set by a servo pattern at the point P1, an actual data recording track is formed with a position (the position shown by the dotted line L11*a*) a distance Ha apart from the track center Ct as the track center Ctx. Accordingly, as shown on the left in FIG. 14, during the reads of data, in the vicinity of the point P1 described above, by adjusting the head position of the magnetic head 3 with an adjustment, which has been calculated based on the distance Ha as the offset, as a target value, it is possible to align the center C3*r* of the reproducing element 3*r* with the track center Ctx (the position shown by the dotted line L11*a* in FIG. 14) of the actual data recording track (i.e., the reproducing element 3*r* can be made on-track to the data recording track).

Also, as shown on the right in FIG. 18, as one example, when a magnetic signal has been written using the recording element 3*w* in a state where the reproducing element 3*r* is positioned at the track center Ct of a virtual data recording track at the point P2, an actual data recording track is formed with a position (the position shown by the dashed line L11*b*) a distance Hb from the track center Ct as the track center Ctx. Accordingly, as shown on the right in FIG. 14, during the reads of data, in the vicinity of the point P2 described above, by adjusting the head position of the magnetic head 3 with an adjustment calculated based on the distance Hb as the offset as a target value, it is possible to align the center C3r of the reproducing element 3r with the track center Ctx (the position shown by the dotted line L11b in FIG. 14) of the actual data recording track (i.e., the reproducing element 3r can be made on-track to the data recording track).

For this reason, a hard disk drive equipped with the magnetic disk 10D may be constructed so that during tracking servo control on the reproducing element 3r as the "one element" for the present invention, the offset is changed at least once per revolution of the magnetic disk 10D so that the offset corresponds to each reproducing position. In this way, according to a hard disk drive (recording/reproducing apparatus) that includes the magnetic disk 10D and is constructed to carry out tracking servo control according to the tracking servo control method according to the present invention, it is possible to adjust the head position of the magnetic head 3 using an offset corresponding to each recording/reproducing position in the circumferential direction of the data track patterns and therefore to reliably make the reproducing element 3r on-track to a data recording track for an entire revolution of the magnetic disk 10D. Accordingly, it is possible to read a magnetic signal from a data recording track with a sufficient read width while avoiding a situation where the read width of a magnetic signal from the data recording track becomes insufficient. As a result, it is possible to obtain a reproducing signal with a sufficiently high output level. By doing so, it is possible to properly reproduce data without reproducing errors. It is also possible to reliably read data from only the desired data recording track while avoiding the side reading phenomenon.

Note that a hard disk drive equipped with the magnetic disk 10D is not limited to a construction that adjusts the head position of the magnetic head 3 in accordance with an offset to make the reproducing element 3r on-track to a data recording track during the reads of data (i.e., during reproducing) as described above. For example, in the same way as the hard disk drive 1 equipped with the magnetic disk 10 described earlier, it is also possible to use a construction that adjusts the head position of the magnetic head 3 in accordance with an offset during the writes of data (i.e., during recording). In addition, although an example where tracking servo control is carried out using one offset per control region has been described, it is possible to use a construction that carries out tracking over the magnetic head 3 by continuously changing the offset in infinite or many steps in accordance with rotation of the swing arm 4a even within one sector, for example. By using this construction, it is possible to adjust the head position with even higher precision than a construction that carries out tracking servo control using one offset in a control region.

What is claimed is:

1. A recording/reproducing apparatus comprising:
a rotary-type magnetic recording medium including a track pattern in which concentric or spiral data recording tracks are provided;
a composite magnetic head including a reproducing element that carries out a read of a magnetic signal from the magnetic recording medium and a recording element that carries out a write of a magnetic signal on the magnetic recording medium;
a control unit that moves the magnetic head over the magnetic recording medium to carry out tracking servo control on one element out of the reproducing element and the recording element to keep the one element on one of the data recording tracks; and
a storage unit that stores offset information capable of specifying an offset for calculating an adjustment used to adjust a head position of the magnetic head during the tracking servo control, the offset being a distance along a radial direction between a center of the reproducing element that constructs the composite magnetic head and a center of the recording element that constructs the composite magnetic head,
wherein the storage unit stores information that specifies at least two different offsets per revolution of one of the data recording tracks as the offset information, and
during the tracking servo control on one element out of the reproducing element and the recording element as in a read of data from one of the data recording tracks that is carried out by reading the magnetic signal from the one of the data recording tracks in a state where the reproducing element is kept on the one of the data recording tracks, or a write of data on one of the data recording tracks that is carried out by writing the magnetic signal on the one of the data recording tracks in a state where the recording element is kept on the one of the data recording tracks, the control unit adjusts the head position by changing the adjustment at least once during a single rotation of the magnetic recording medium in accordance with offsets specified based on the offset information.

2. A recording/reproducing apparatus according to claim 1, wherein the storage unit stores, as the offset information, plural offsets set corresponding to plural control regions produced by dividing the magnetic recording medium in both the radial direction and a circumferential direction of the track pattern, and
during the tracking servo control on the one element, to keep the one element on a data recording track included in a control region out of the control regions, the control unit adjusts the head position with the adjustment calculated based on the offset set corresponding to the control region.

3. A recording/reproducing apparatus according to claim 2, wherein the control unit is constructed so as to be capable of carrying out an offset information obtaining process that generates the offset information and stores the offset information in the storage unit, and in the offset information obtaining process, the control unit separately carries out measurement of all of the offsets to be stored in the storage unit for each corresponding control region and generates the offset information.

4. A recording/reproducing apparatus according to claim 2, wherein the control unit is constructed so as to be capable of carrying out an offset information obtaining process that generates the offset information and stores the offset information in the storage unit, and in the offset information obtaining process, the control unit separately carries out measurement of part of all of the offsets to be stored in the storage unit for each corresponding control region, calculates offsets out of all of the offsets aside from the part of the offsets by carrying out an interpolation process using the part of the offset, and generates the offset information based on the measured offsets and the calculated offsets.

5. A recording/reproducing apparatus according to claim 1, wherein the storage unit stores, as the offset information, plural offsets set corresponding to part of plural control regions produced by dividing the magnetic recording medium in both the radial direction and a circumferential direction of the track pattern, during the tracking servo control on the one element, to keep the one element on a data recording track included in a control region out of the part of the control regions, the control unit adjusts the head position using the adjustment calculated based on the offset set corresponding to the control region, and during the tracking servo control on the one element, to keep the one element on a data recording track included in a control region out of the control regions aside from the part of the control regions, the control unit adjusts the head position using the adjustment calculated based on an offset calculated corresponding to the control region out of the control regions aside from the part of the control regions according to an interpolation process using the offset information.

6. A recording/reproducing apparatus according to claim 5, wherein the control unit is constructed so as to be capable of carrying out an offset information obtaining process that generates the offset information and stores the offset information in the storage unit, and in the offset information obtaining process, the control unit separately carries out measurement of all of the offsets to be stored in the storage unit for each corresponding control region and generates the offset information.

7. A recording/reproducing apparatus according to claim 5, wherein the control unit is constructed so as to be capable of carrying out an offset information obtaining process that generates the offset information and stores the offset information in the storage unit, and in the offset information obtaining process, the control unit separately carries out measurement of part of all of the offsets to be stored in the storage unit for each corresponding control region, calculates offsets out of all of the offsets aside from the part of the offsets by carrying out an interpolation process using the part of the offset, and generates the offset information based on the measured offsets and the calculated offsets.

8. A recording/reproducing apparatus according to claim 1, wherein the control unit is constructed so as to be capable of carrying out an offset information obtaining process that generates the offset information and stores the offset information in the storage unit, the offset information obtaining process including:

a standard offset obtaining process that obtains standard offsets corresponding to same-rotational-radius positions at a predetermined pitch on the magnetic recording medium;

a separation distance obtaining process that obtains, corresponding to rotational positions at a predetermined pitch along the direction of rotation of the magnetic recording medium, separation distances along a rotational radius of the magnetic recording medium between a predetermined same-pattern-radius position on the magnetic recording medium and a predetermined same-rotational-radius position out of the same-rotational-radius positions; and an offset specifying process that specifies an offset corresponding to a desired recording/reproducing position on the magnetic recording medium based on the standard offset corresponding to each same-rotational-radius position and the separation distance corresponding to each rotational position, wherein the control unit generates the offset information based on the specified offsets.

9. A recording/reproducing apparatus according to claim 8, wherein during the standard offset obtaining process, the control unit obtains the standard offsets in association with the track numbers, during the separation distance obtaining process, the control unit maintains a state where the magnetic head is positioned at the predetermined same-rotational-radius positions while rotating the magnetic recording medium, reads sector numbers and track numbers from each sector at the predetermined same-rotational-radius positions via the reproducing element, and, with sectors at the predetermined same-rotational-radius positions as the predetermined rotational positions, based on a track number, as the predetermined same-pattern-radius position, of a standard track and on a track number read for each sector, obtains a number of tracks between each sector and the standard track as the separation distances, and during the offset specifying process, the control unit specifies, as an offset of the desired recording/reproducing position, the standard offset associated with a track number of a track separated from the desired recording/reproducing position by a number of tracks obtained as the separation distance of a sector positioned in a same direction from the pattern center as the desired recording/reproducing position out of the sectors at the predetermined same-rotational-radius positions.

10. A recording/reproducing apparatus according to claim 1, wherein the control unit is constructed so as to be capable of carrying out an offset information obtaining process that generates the offset information and stores the offset information in the storage unit, the offset information obtaining process including:

a standard offset obtaining process that obtains standard offsets corresponding to same-pattern-radius positions at a predetermined pitch on the magnetic recording medium;

a separation distance obtaining process that obtains, corresponding to rotational positions at a predetermined pitch along the direction of rotation of the magnetic recording medium, separation distances along a pattern radius direction of the track pattern between a predetermined same-rotational-radius position on the magnetic recording medium and a predetermined same-pattern-radius position out of the same-pattern-radius positions; and recording/reproducing position on the magnetic recording medium based on the standard offset an offset specifying process that specifies an offset corresponding to a desired corresponding to each same pattern-radius position and the separation distance corresponding to each rotational position, wherein the control unit generates the offset information based on the specified offsets.

11. A recording/reproducing apparatus according to claim 10, wherein during the standard offset obtaining process, the control unit obtains the standard offsets in association with the track numbers, during the separation distance obtaining process, the control unit maintains a state where the magnetic head is positioned at the predetermined same-rotational-radius positions while rotating the magnetic recording medium, reads sector numbers and track numbers from each sector at the predetermined same-rotational-radius positions via the reproducing element, and, with sectors at the predetermined same-rotational-radius positions as the predetermined rotational positions, based on a track number, as the predetermined same-pattern-radius position, of a standard track and on a track number read for each sector, obtains a number of tracks between each sector and the standard track as the separation distances, and during the offset specifying process, the control unit specifies, as an offset of the desired recording/reproducing position, the standard offset associated with a track number of a track separated from the desired recording/reproducing position by a number of tracks obtained as the separation distance of a sector positioned in a same direction from the pattern center as the desired recording/reproducing position out of the sectors at the predetermined same-rotational-radius positions.

12. A tracking servo control method that moves a composite magnetic head including a reproducing element, which carries out a read of a magnetic signal from a rotary-type magnetic recording medium with a track pattern in which concentric or spiral data recording tracks are provided, and a recording element, which carries out a write of a magnetic signal on the magnetic recording medium, over the magnetic recording medium to keep one element out of the reproducing element and the recording element on one of the data recording tracks, wherein during tracking servo control on one element out of the reproducing element and the recording element as in a read of data from one of the data recording tracks that is carried out by reading the magnetic signal from the one of the data recording tracks in a state where the reproducing element is kept on the one of the data recording tracks, or a write of data on one of the data recording tracks that is carried out by writing the magnetic signal on the one of the data recording tracks in a state where the recording element is kept on the one of the data recording tracks, a head position of the magnetic head is adjusted by changing, at least once during a single rotation of the magnetic recording medium, an adjustment used to adjust the head position of the magnetic head in accordance with offsets, that are a distance along a radial direction between a center of the reproducing element that constructs the composite magnetic head and a center of the recording element that constructs the composite magnetic head, specified based on offset information capable of specifying at least two different offsets.

* * * * *

UNITED STATES PATENT AND TRADEMARK OFFICE
CERTIFICATE OF CORRECTION

| | | |
|---|---|---|
| PATENT NO. | : 7,800,859 B2 | |
| APPLICATION NO. | : 12/036367 | |
| DATED | : September 21, 2010 | |
| INVENTOR(S) | : Makoto Moriya et al. | |

It is certified that error appears in the above-identified patent and that said Letters Patent is hereby corrected as shown below:

At Column 38, Lines 46-47 (Claim 10, Lines 20-21) of the printed patent, remove "recording/reproducing position on the magnetic recording medium based on the standard offset".

At Column 38, Line 49 (Claim 10, Line 23) of the printed patent, after "to the desired" add -- recording/reproducing position on the magnetic recording medium based on the standard offset --.

Signed and Sealed this
Twenty-sixth Day of April, 2011

David J. Kappos
*Director of the United States Patent and Trademark Office*